United States Patent
Sato

(10) Patent No.: US 12,255,469 B2
(45) Date of Patent: Mar. 18, 2025

(54) POWER TRANSMITTING APPARATUS WITH ABILITY TO APPROPRIATELY LIMIT POWER TRANSMISSION, CONTROL METHOD FOR POWER TRANSMITTING APPARATUS, AND STORAGE MEDIUM THEREOF

(71) Applicant: CANON KABUSHIKI KAISHA, Tokyo (JP)

(72) Inventor: Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/328,944

(22) Filed: May 24, 2021

(65) Prior Publication Data
US 2021/0281125 A1    Sep. 9, 2021

Related U.S. Application Data

(63) Continuation of application No. PCT/JP2019/044799, filed on Nov. 15, 2019.

(30) Foreign Application Priority Data

Nov. 28, 2018 (JP) ................................ 2018-222508

(51) Int. Cl.
*H02J 50/80* (2016.01)
*H02J 7/02* (2016.01)
(Continued)

(52) U.S. Cl.
CPC ............... *H02J 50/80* (2016.02); *H02J 7/02* (2013.01); *H02J 50/12* (2016.02); *H04B 5/48* (2024.01); *H02J 50/20* (2016.02); *H02J 50/30* (2016.02)

(58) Field of Classification Search
CPC ................................... H02J 50/00; H04B 5/00
See application file for complete search history.

(56) References Cited

U.S. PATENT DOCUMENTS

| 11,088,725 B2 | 8/2021 | Park | |
|---|---|---|---|
| 2013/0062959 A1* | 3/2013 | Lee | H04B 5/77 307/104 |

(Continued)

FOREIGN PATENT DOCUMENTS

| CN | 103138358 A | 6/2013 |
|---|---|---|
| CN | 104734278 A | 6/2015 |

(Continued)

OTHER PUBLICATIONS

The Qi wireless power transfer system power class 0 specification—Parts 1 and 2: Interface Definitions. IEC PAS 63095-1. Edition 1.0 May 2017. International Electrotechnical Commission (IEC).

*Primary Examiner* — Adi Amrany
(74) *Attorney, Agent, or Firm* — Canon U.S.A., Inc. IP Division

(57) ABSTRACT

In a case where a power receiving apparatus detected by communication with a first communication unit, and an apparatus performing communication based on a standard of Near Field Communication (NFC) that has been detected by communication with a second communication unit 106 are the same apparatuses, a control unit controls a power transmitting unit to perform power transmission with higher power than power used in a case where the power receiving apparatus and the apparatus are not the same apparatuses.

12 Claims, 10 Drawing Sheets

(51) Int. Cl.
  *H02J 50/12*  (2016.01)
  *H04B 5/48*  (2024.01)
  *H02J 50/20*  (2016.01)
  *H02J 50/30*  (2016.01)

(56)  References Cited

U.S. PATENT DOCUMENTS

| | | | | |
|---|---|---|---|---|
| 2013/0119778 | A1* | 5/2013 | Jung | H04B 5/0037 |
| | | | | 307/104 |
| 2014/0159653 | A1* | 6/2014 | Von Novak | H02J 50/40 |
| | | | | 320/108 |
| 2015/0004914 | A1 | 1/2015 | Kusakabe | |
| 2016/0099604 | A1* | 4/2016 | Von Novak, III | H02J 7/025 |
| | | | | 320/108 |
| 2016/0172893 | A1* | 6/2016 | Yoon | H02J 7/025 |
| | | | | 320/108 |
| 2017/0061142 | A1* | 3/2017 | Niessen | G06F 21/604 |
| 2017/0207663 | A1* | 7/2017 | Park | H02J 50/402 |
| 2017/0288461 | A1* | 10/2017 | Konanur | H04B 5/79 |
| 2017/0294798 | A1* | 10/2017 | Yuk | H04B 5/0037 |
| 2017/0366232 | A1* | 12/2017 | Lee | H02J 50/60 |
| 2018/0225486 | A1* | 8/2018 | Teruyama | H04W 76/14 |
| 2019/0013703 | A1 | 1/2019 | Shichino | |
| 2019/0148966 | A1* | 5/2019 | Choi | H02J 7/00034 |
| | | | | 307/104 |
| 2019/0148980 | A1* | 5/2019 | Kim | H02J 50/12 |
| | | | | 307/104 |
| 2019/0260219 | A1* | 8/2019 | Zhao | H01F 38/14 |
| 2019/0305826 | A1* | 10/2019 | Park | H02J 5/00 |
| 2021/0265867 | A1* | 8/2021 | Park | H02J 50/12 |

FOREIGN PATENT DOCUMENTS

| | | |
|---|---|---|
| CN | 105144545 A | 12/2015 |
| CN | 105305527 A | 2/2016 |
| CN | 105493374 A | 4/2016 |
| JP | 2014075857 A | 4/2014 |
| JP | 2014093818 A | 5/2014 |
| JP | 2016-007116 A | 1/2016 |
| JP | 2017-011954 A | 1/2017 |
| JP | 2017-085699 A | 5/2017 |
| JP | 2017184383 A | 10/2017 |
| JP | 2017184488 A | 10/2017 |
| KR | 20150110405 A | 10/2015 |
| KR | 20160059395 A | 5/2016 |
| KR | 20190054416 A | 5/2019 |
| WO | 2017/169442 A1 | 10/2017 |
| WO | 2018/005135 A1 | 1/2018 |
| WO | 2018/056633 A1 | 3/2018 |

* cited by examiner

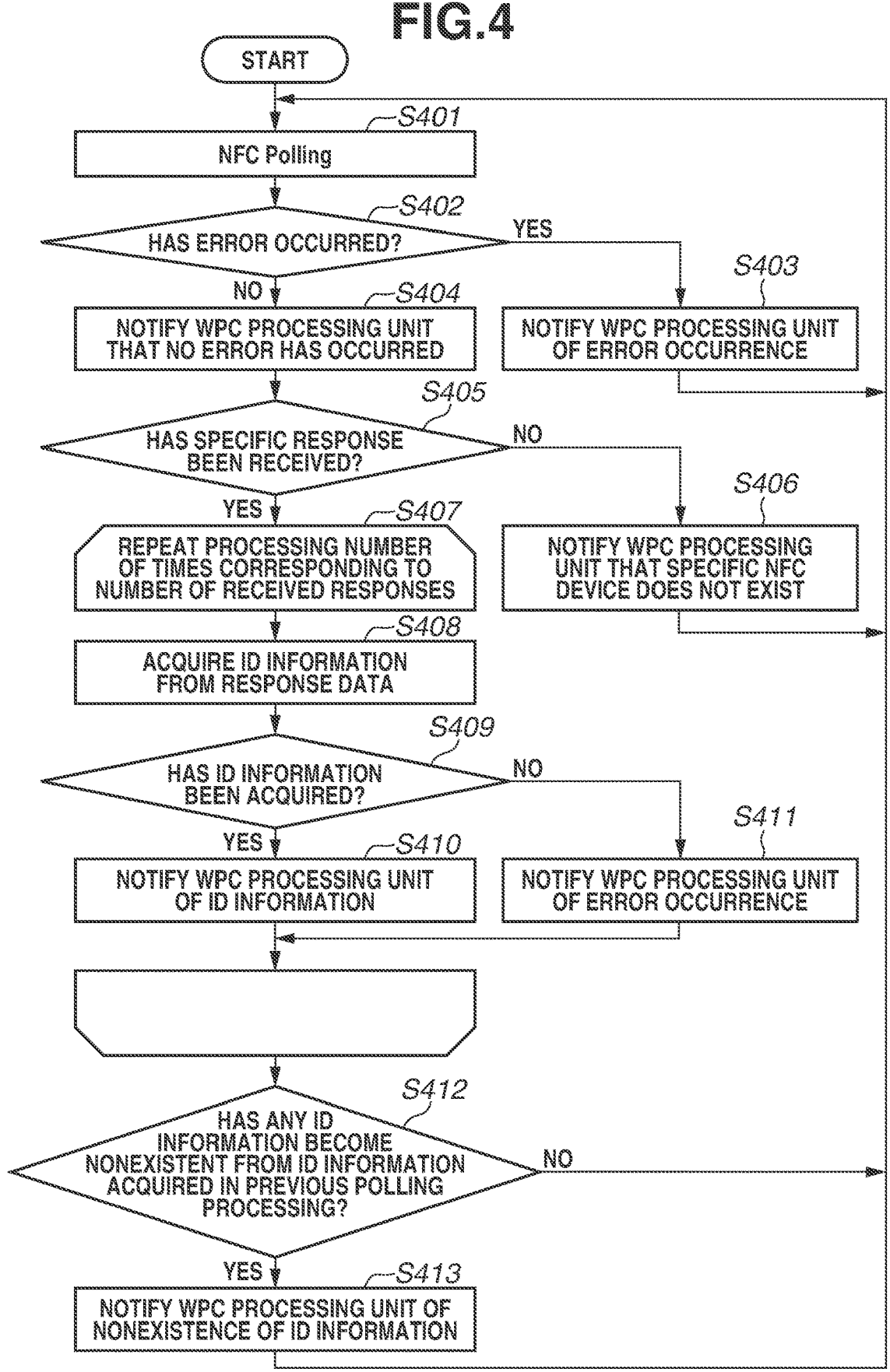

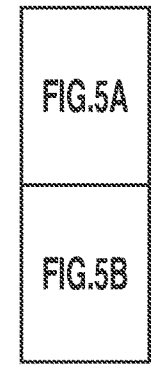
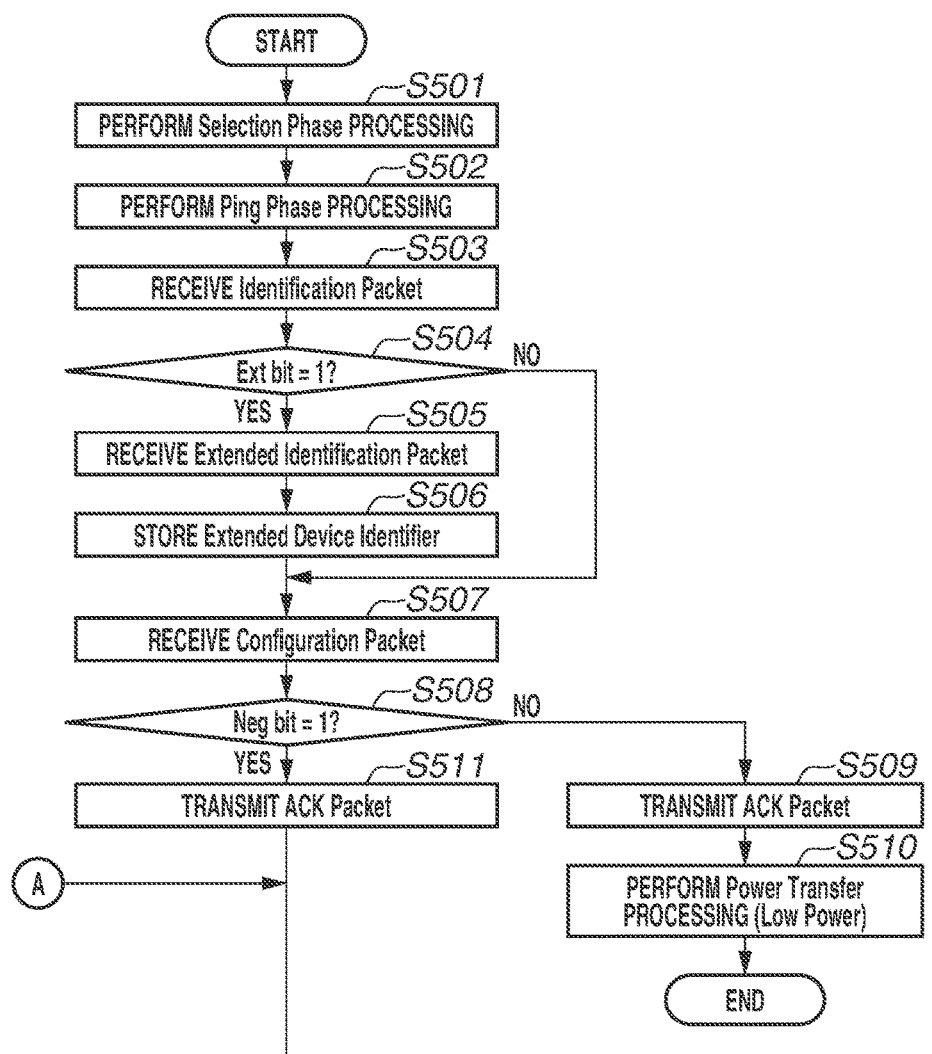

POWER TRANSMITTING APPARATUS WITH ABILITY TO APPROPRIATELY LIMIT POWER TRANSMISSION, CONTROL METHOD FOR POWER TRANSMITTING APPARATUS, AND STORAGE MEDIUM THEREOF

CROSS-REFERENCE TO RELATED APPLICATIONS

This application is a Continuation of International Patent Application No. PCT/JP2019/044799, filed Nov. 15, 2019, which claims the benefit of Japanese Patent Application No. 2018-222508, filed Nov. 28, 2018, both of which are hereby incorporated by reference herein in their entireties.

BACKGROUND

Field

The present disclosure relates to a power transmitting apparatus, a control method for a power transmitting apparatus, and a storage medium.

Background Art

Technical development of wireless power transmitting systems, such as wireless charging systems, has been widely conducted. PTL1 discusses a power transmitting apparatus and a power receiving apparatus that comply with the standard (hereinafter, referred to as a "WPC standard") stipulated by the Wireless Power Consortium (WPC), which is a standard-setting organization of wireless charging.

As one type of wireless communication methods, there is a Near Field Communication (NFC) method. The standard (specification) stipulated by the NFC forum defines a card emulation mode in which a battery-driven NFC module behaves like an NFC tag or an NFC card (hereinafter, collectively referred to as an "NFC tag"). Aside from the card emulation mode, the standard also defines a reader/writer mode for reading an NFC tag, and a Peer to Peer mode for directly exchanging messages between NFC devices. Some of power receiving apparatuses, such as smartphones that comply with the WPC standard, include NFC modules operating in these modes, and perform communication that is based on the standard of NFC.

The NFC tag does not include a battery, and thus the NFC tag is driven using the energy of electromagnetic waves transmitted from a communication partner at the time of communication. If the above-described power transmitting apparatus wirelessly transmits high power to the NFC tag, an antenna element included in the NFC tag can be damaged. For avoiding such a situation, the power transmitting apparatus may restrict power transmission when an object performing communication based on a standard of NFC is detected. Nevertheless, the following problem arises in such a configuration. More specifically, when the power transmitting apparatus detects an object performing communication based on the standard of NFC, the power transmitting apparatus may restrict power transmission irrespective of whether the object is an NFC tag or a power receiving apparatus performing communication based on the standard of NFC. Whereby, a received power amount may become insufficient if power transmission is restricted to the power receiving apparatus that performs communication based on the standard of NFC.

CITATION LIST

Patent Literature

PTL1: Japanese Patent Application Laid-Open No. 2016-007116

SUMMARY

The present disclosure is directed to enabling a power receiving apparatus that performs communication based on a standard of Near Field Communication (NFC), to appropriately receive power.

According to an aspect of the present disclosure, a power transmitting apparatus includes power transmitting means for transmitting power to a power receiving apparatus, first detection means for detecting the power receiving apparatus, second detection means for detecting an apparatus performing communication based on a standard of NFC, and determination means for determining whether the power receiving apparatus detected by the first detection means and the apparatus performing communication based on the standard of NFC that has been detected by the second detection means are same apparatuses. The power transmitting means controls power transmission based on a result of determination performed by the determination means.

Further features of the present disclosure will become apparent from the following description of exemplary embodiments with reference to the attached drawings.

BRIEF DESCRIPTION OF THE DRAWINGS

FIG. 4 is a flowchart illustrating processing in a Near Field Communication (NFC) processing unit of the power transmitting apparatus.

DESCRIPTION OF THE EMBODIMENTS

Hereinafter, an exemplary embodiment of the present disclosure will be described with reference to the drawings. The following exemplary embodiment is merely an example for explaining the technical idea of the present disclosure, and is not intended to limit the invention to configurations and methods to be described in the exemplary embodiment.

(Configuration of System)

Figure 9:
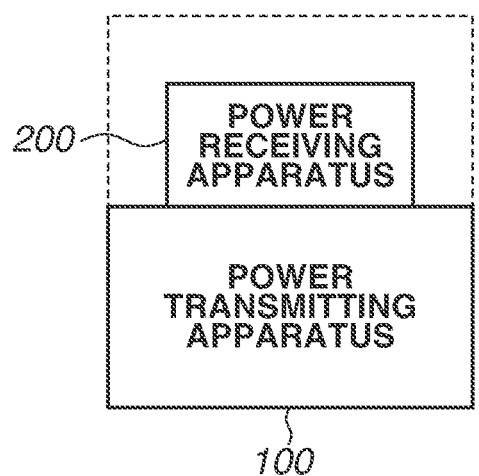
FIG. 9 is a diagram illustrating a configuration example of a wireless charging system.

FIG. 9 illustrates a configuration example of a wireless charging system (wireless power transmitting system) according to the present exemplary embodiment. The present system includes a power transmitting apparatus 100 and a power receiving apparatus 200. Hereinafter, a power transmitting apparatus will be sometimes referred to as a "TX" and a power receiving apparatus will be sometimes referred to as an "RX". A TX 100 and a RX 200 comply with a Wireless Power Consortium (WPC) standard. The RX 200 receives power from the TX 100, and enables charging of a battery. The TX 100 is an electronic device that wirelessly transmits power to the RX 200 placed on a charging stand of the TX 100. The following description will be given of an example case where the RX 200 is placed on the charging stand. Nevertheless, the RX 200 needs not be placed on the charging stand as long as the RX 200 exists within a power transmittable range of the TX 100 (range indicated by a broken line illustrated in FIG. 9) when the TX 100 transmits power to the RX 200.

The RX 200 and the TX 100 can include a function of executing an application other than wireless charging. One example of the RX 200 is a smartphone, and one example of the TX 100 is an accessory device for charging the smartphone. The RX 200 and the TX 100 may be a tablet computer or a storage device, such as a hard disc device or a memory device, or may be an information processing apparatus, such as a personal computer (PC). The RX 200 and the TX 100 may also be an imaging apparatus (e.g., camera, and video camera).

The RX 200 is equipped with a Near Field Communication (hereinafter, referred to as "NFC") function. Using the NFC function, the RX 200 can read an NFC tag and perform electronic money payment, for example. The TX 100 is also equipped with an NFC function for reading an NFC tag. Thus, the TX 100 can detect an NFC tag by performing communication based on a standard of NFC. Furthermore, the TX 100 can stop or restrict power transmission processing for protecting an NFC tag, based on the detection result.

The system performs wireless power transmission using an electromagnetic induction method for wireless charging, based on the WPC standard. More specifically, the RX 200 and the TX 100 perform wireless power transmission for wireless charging based on the WPC standard, between a power receiving antenna of the RX 200 and a power transmitting antenna of the TX 100. The wireless power transmitting method (contactless power transmitting method) applied to the system is not limited to a method defined by the WPC standard, and may be another electromagnetic induction method, a magnetic field resonance method, an electric field resonance method, a microwave method, or a method that uses laser. In addition, in the present exemplary embodiment, wireless power transmission is used for wireless charging, but wireless power transmission may be performed for the purpose other than wireless charging.

In the WPC standard, the magnitude of power guaranteed when the RX 200 receives power from the TX 100 is defined by a value called Guaranteed Power (hereinafter, referred to as "GP"). The GP indicates a value of power guaranteed to be output to the load (e.g., circuit for charging) of the RX 200 even if a positional relationship between the RX 200 and the TX 100 varies, for example, and the efficiency of power transmission between the power receiving antenna and the power transmitting antenna declines. For example, in a case where the GP is 5 watt, the TX 100 performs power transmission while performing control in such a manner that 5 watt can be output to the load in the RX 200, even if a positional relationship between the power receiving antenna and the power transmitting antenna varies and power transmission efficiency declines.

The RX 200 and the TX 100 according to the present exemplary embodiment perform communication for power transmission and reception control based on the WPC standard. The WPC standard defines a plurality of phases including a Power Transfer phase in which power transmission is executed and phases before a phase in which actual power transmission is performed. In each phase, communication necessary for power transmission and reception control is performed. The phases before power transmission include a Selection phase, a Ping phase, an Identification and Configuration phase, a Negotiation phase, and a Calibration phase. Hereinafter, the Identification and Configuration phase will be referred to as an I&C phase.

In the Selection phase, the TX 100 intermittently transmits an Analog Ping, and detects that an object (e.g., the RX 200 or a conductor strip) is placed on a charging stand of the TX 100. The TX 100 detects at least either one of a voltage value and a current value of the power transmitting antenna that are obtained when the Analog Ping is transmitted. If the voltage value falls below a certain threshold value or if the current value exceeds a certain threshold value, the TX 100 determines that an object exists, and transitions to the Ping phase.

In the Ping phase, the TX 100 transmits a Digital Ping larger in power than the Analog Ping. The magnitude of power of the Digital Ping is power sufficient for activating a control unit of the RX 200 placed on the charging stand of the TX 100. The RX 200 notifies the TX 100 of the magnitude of received voltage. In this manner, by receiving a response from the RX 200 that has received the Digital Ping, the TX 100 recognizes that the object detected in the Selection phase is the RX 200.

When the TX 100 receives a notification of a received voltage value, the TX 100 transitions to the I&C phase. In the I&C phase, the TX 100 identifies the RX 200, and acquires device configuration information (capability information) from the RX 200. Thus, the RX 200 transmits an ID Packet and a Configuration Packet to the TX 100. The ID Packet includes identifier information of the RX 200, and the Configuration Packet includes device configuration information (capability information) of the RX 200. The TX 100, which has received the ID Packet and the Configuration Packet, transmits an acknowledge response (ACK, positive response). The I&C phase then ends.

In the Negotiation phase, a value of GP is determined based on, for example, a value of GP requested by the RX 200 and power transmission capability of the TX 100.

In the Calibration phase, the RX 200 notifies the TX 100 of a received power value based on the WPC standard, and the TX 100 performs adjustment for efficiently transmitting power.

In the Power Transfer phase, control for starting or continuing power transmission, and for stopping power transmission due to an error or full charge is performed.

For such power transmission and reception control, the TX 100 and the RX 200 perform communication (hereinafter, referred to as "first communication") of superimposing a signal onto electromagnetic waves transmitted from an antenna, using the same antenna (coil) as wireless power transmission based on the WPC standard. A range within which the first communication based on the WPC standard can be performed between the TX 100 and the RX 200 is substantially similar to the power transmittable range (range indicated by the broken line illustrated in FIG. 9) of the TX 100.

The TX 100 and the RX 200 may perform communication (hereinafter, referred to as "second communication") for such power transmission and reception control using a different antenna and frequency from those used in wireless power transmission. For example, the frequency band of electromagnetic waves used in the second communication is higher than the frequency band of electromagnetic waves used in the first communication. In this case, the second communication can bring higher-speed communication than that used in the first communication.

As an example of the second communication, there is a communication method that complies with the Bluetooth® Low Energy (hereinafter, referred to as "BLE") standard. In this case, the TX 100 operates as a Peripheral of BLE and the RX 200 operates as a Central of BLE. However, these roles of BLE may be opposite. Alternatively, the second communication may be performed by another communication method, such as an Institute of Electrical and Electronics Engineers (IEEE) 802.11 standard series wireless local area network (LAN) (e.g., Wi-Fi®) or ZigBee®. When the TX 100 can perform the second communication and the RX 200 exists within the power transmittable range, the RX 200 and the TX 100 can exchange information via the second communication.

(Apparatus Configuration)

Configurations of the power transmitting apparatus 100 (TX 100) and the power receiving apparatus 200 (RX 200) according to the present exemplary embodiment will now be described. The following configurations are merely examples, and a part (or all in some cases) of the configurations to be described below may be omitted or replaced with other configurations having other similar functions, or additional configurations may be added to the configurations to be described below. Furthermore, one block to be described below may be divided into a plurality of blocks or a plurality of blocks may be integrated into one block.

Figure 1:
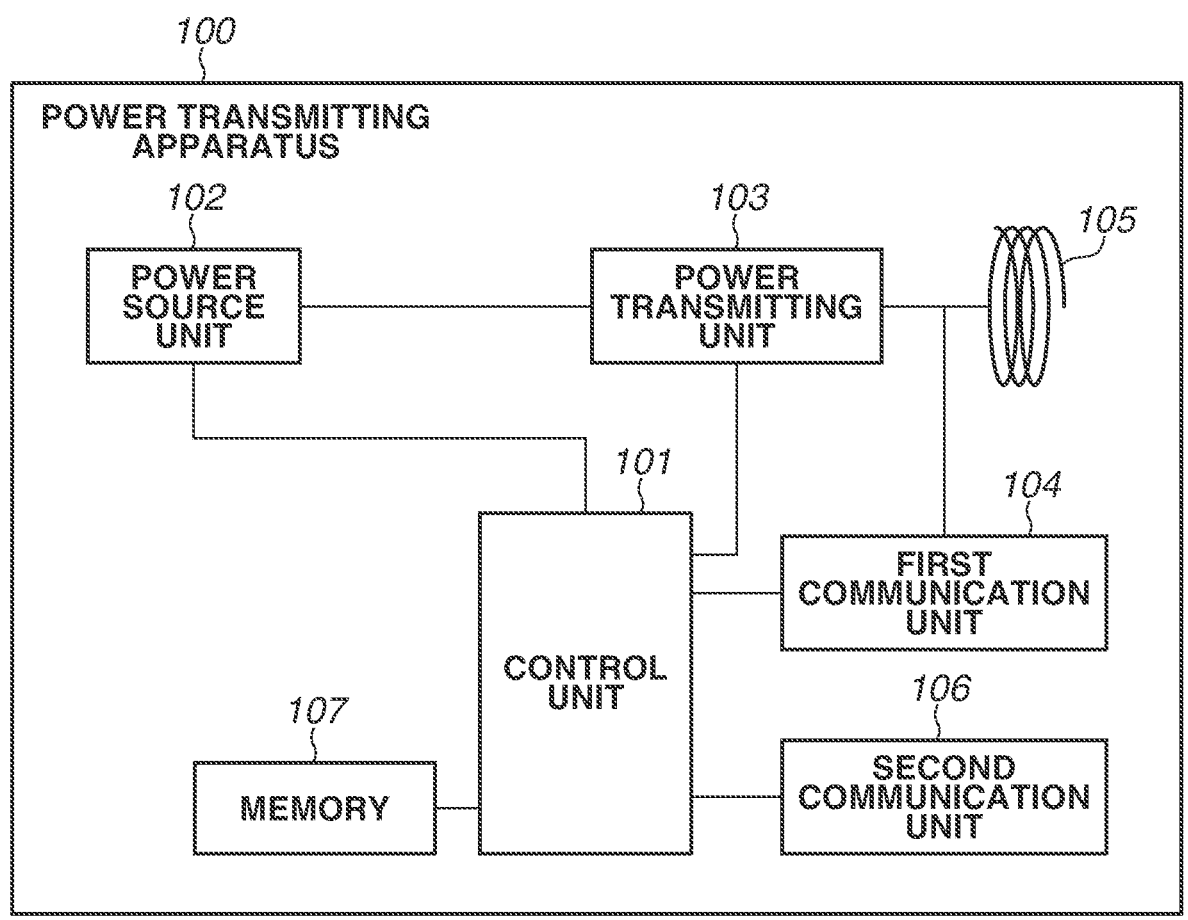
FIG. 1 is a block diagram illustrating a configuration example of a power transmitting apparatus according to an exemplary embodiment.

FIG. 1 is a block diagram illustrating a configuration example of the TX 100 according to the present exemplary embodiment. The TX 100 includes a control unit 101, a power source unit 102, a power transmitting unit 103, a first communication unit 104, a power transmitting antenna 105, a second communication unit 106, and a memory 107. Although the control unit 101, the power source unit 102, the power transmitting unit 103, the first communication unit 104, the second communication unit 106, and the memory 107 are illustrated as separate blocks in FIG. 1, a plurality of arbitrary blocks of these blocks may be mounted on the same chip.

The control unit 101 controls the entire TX 100 by executing a control program stored in the memory 107, for example. The control unit 101 performs control related to power transmission control including communication for device authentication in the TX 100. Furthermore, the control unit 101 may perform control for executing an application other than wireless power transmission. The control unit 101 includes one or more processors, such as a central processing unit (CPU) or a microprocessor unit (MPU). The control unit 101 may include hardware dedicated for specific processing, such as an application specific integrated circuit (ASIC). The control unit 101 may also include an array circuit, such as a field programmable gate array (FPGA) compiled to execute predetermined processing. The control unit 101 stores, into the memory 107, information to be stored during the execution of various types of processing. In addition, the control unit 101 can measure a time using a timer (not illustrated).

The power source unit 102 supplies power to each block. The power source unit 102 is, for example, a commercial power source or a battery. Power supplied from the commercial power source is stored in the battery.

The power transmitting unit 103 generates electromagnetic waves to be received by the RX 200, by converting direct-current or alternating-current power input from the power source unit 102, into alternating-current frequency power in the frequency band used for wireless power transmission, and inputting the alternating-current frequency power to the power transmitting antenna 105. For example, the power transmitting unit 103 converts direct-current voltage supplied by the power source unit 102, into alternating-current voltage using a switching circuit having a half-bridge or full-bridge configuration that uses a field effect transistor (FET). In this case, the power transmitting unit 103 includes a gate driver for controlling ON/OFF of the FET.

The power transmitting unit 103 controls the intensity of electromagnetic waves to be output, by adjusting either or both of voltage (power transmission voltage) and current (power transmission current) input to the power transmitting antenna 105. If the power transmission voltage or the power transmission current is made large, the intensity of electromagnetic waves becomes high. In contrast, if the power transmission voltage or the power transmission current is made small, the intensity of electromagnetic waves becomes low. The power transmitting unit 103 performs output control of alternating-current frequency power in such a manner as to start or stop power transmission from the power transmitting antenna 105, based on an instruction from the control unit 101. The power transmitting unit 103 has a capability of supplying power for outputting 15-watt electric power to a charging unit of the RX 200 that complies with the WPC standard.

The first communication unit 104 performs, with the RX 200, the above-described communication for power transmission control based on the WPC standard. The first communication unit 104 performs the first communication by modulating electromagnetic waves output from the power transmitting antenna 105, and transmitting information to the RX 200. The first communication unit 104 also acquires information transmitted by the RX 200, by demodulating electromagnetic waves output from the power transmitting antenna 105 and modulated by the RX 200. In other words, the first communication performed by the first communication unit 104 is executed in such a manner that a signal is superimposed on electromagnetic waves transmitted from the power transmitting antenna 105. The first communication unit 104 may communicate with the RX 200 using the second communication in place of the first communication, or may communicate with the RX 200 selectively using the first communication and the second communication. In a case where the first communication unit 104 performs the second communication, the TX 100 includes an antenna different from the power transmitting antenna 105.

The second communication unit 106 communicates with another NFC device using an NFC function. The NFC device in the present exemplary embodiment includes an NFC tag unless otherwise stated. By using the second communication unit 106, the TX 100 can detect the existence of an NFC tag. If an NFC tag is detected by the second communication unit 106, the control unit 101 restricts power transmission by controlling the power transmitting unit 103 to stop power transmission or lower the power of power transmission. The second communication unit 106 includes an antenna (not illustrated) different from the power transmitting antenna 105.

The second communication unit 106 is controlled by the control unit 101, but the second communication unit 106 may be controlled by a control unit of a not illustrated different device (camera, smartphone, tablet PC, or laptop PC) that includes the TX 100.

The memory 107 also stores states of the TX 100 and the RX 200 in addition to control programs.

Figure 2:
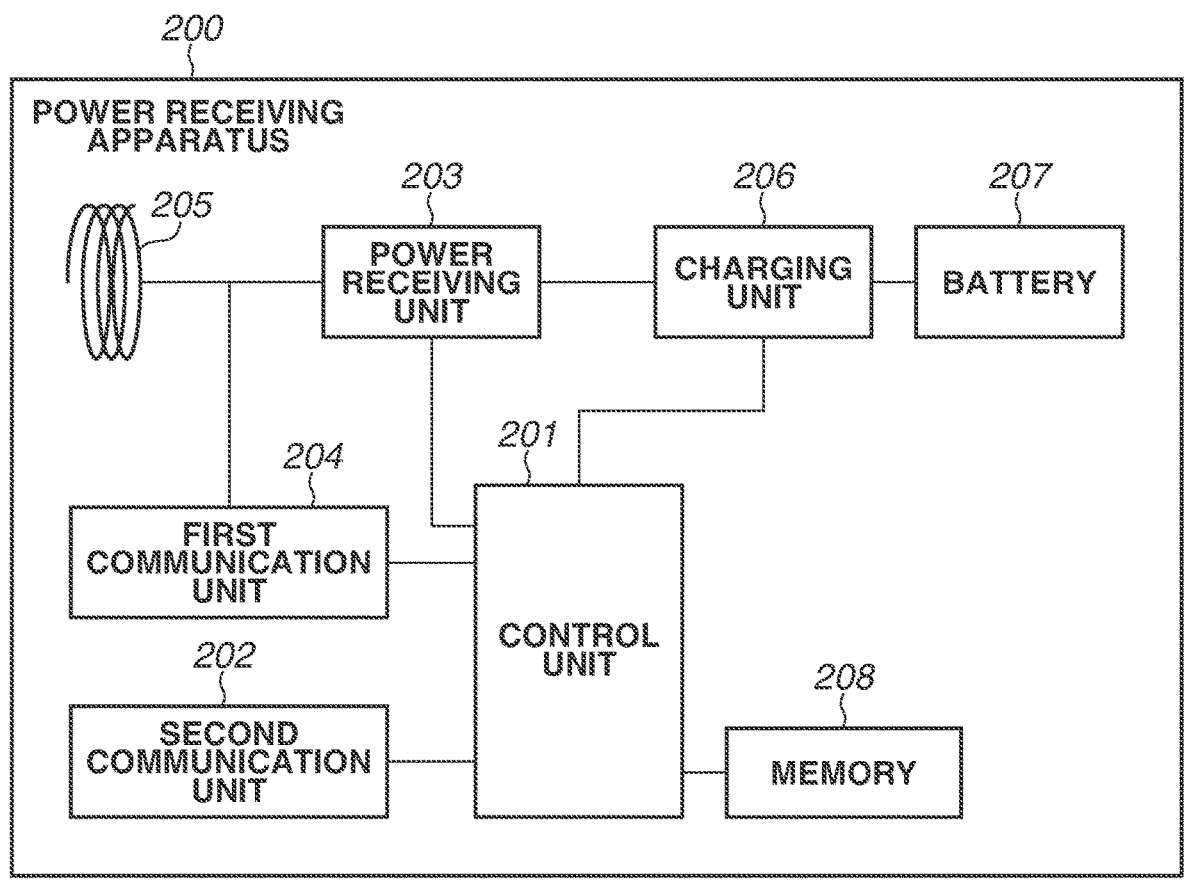
FIG. 2 is a block diagram illustrating a configuration example of a power receiving apparatus according to an exemplary embodiment.

FIG. 2 is a block diagram illustrating a configuration example of the RX 200 according to the present exemplary embodiment. The RX 200 includes a control unit 201, a second communication unit 202, a power receiving unit 203, a first communication unit 204, a power receiving antenna 205, a charging unit 206, a battery 207, and a memory 208. A plurality of blocks illustrated in FIG. 2 may be implemented as one hardware module.

The control unit 201 controls the entire RX 200 by executing a control program stored in, for example, the memory 208. In other words, the control unit 201 controls each functional unit illustrated in FIG. 2. Furthermore, the control unit 201 may perform control for executing an application other than wireless power transmission. As an example, the control unit 201 includes one or more processors, such as a CPU or a MPU. The control unit 201 may control the entire smartphone in cooperation with an operating system (OS) executed by the control unit 201.

The control unit 201 may include hardware, such as an ASIC, dedicated for specific processing. The control unit 201 may include an array circuit, such as an FPGA compiled to execute predetermined processing. The control unit 201 stores, into the memory 208, information to be stored during the execution of various types of processing. In addition, the control unit 201 can measure a time using a timer (not illustrated).

The second communication unit 202 performs communication processing with another communication device using an NFC function. The second communication unit 202 operates in a mode that complies with a standard stipulated by, for example, the NFC forum. The above-described mode includes, for example, a card emulation mode for playing an alternative role as a contactless IC card, a reader/writer mode for reading an NFC tag, and a Peer to Peer mode (P2P) mode for directly exchanging messages between NFC devices. For example, electronic money payment becomes executable by using the card emulation mode.

The second communication unit 202 includes an antenna (not illustrated), which is different from the power receiving antenna 205, for performing communication based on the standard of NFC. The second communication unit 202 is controlled by the control unit 201. However, the second communication unit 202 may be controlled by a control unit of a not illustrated different device (camera, smartphone, tablet PC, or laptop PC) that includes the RX 200.

The power receiving unit 203 acquires, with the power receiving antenna 205, alternating-current power (alternating-current voltage and alternating current) generated by electromagnetic induction generated by electromagnetic waves emitted from the power transmitting antenna 105 of the TX 100. The power receiving unit 203 converts the alternating-current power into direct current or alternating-current power at a predetermined frequency, and outputs power to the charging unit 206, which performs processing for charging the battery 207. In other words, the power receiving unit 203 supplies power to the load in the RX 200. The above-described GP is an amount of power guaranteed to be output from the power receiving unit 203. The power receiving unit 203 has a capability of supplying power for the charging unit 206 to charge the battery 207, and a capability of supplying power for outputting 15-watt power to the charging unit 206.

The first communication unit 204 performs the above-described communication for power receiving control based on the WPC standard, with the first communication unit 104 included in the TX 100. The first communication unit 204 acquires information transmitted from the TX 100, by demodulating electromagnetic waves input from the power receiving antenna 205. The first communication unit 204 performs load modulation of the input electromagnetic waves and thereby superimposes a signal related to information to be transmitted to the TX 100, onto the electromagnetic waves. The first communication unit 204 thereby performs the first communication with the TX 100. The first communication unit 204 may communicate with the TX 100 using the second communication in place of the first communication, or may communicate with the TX 100 selectively using the first communication and the second communication. In a case where the first communication unit 204 performs the second communication, the RX 200 includes an antenna different from the power receiving antenna 205.

The memory 208 also stores states of the TX 100 and the RX 200 in addition to the control program.

Figure 3:
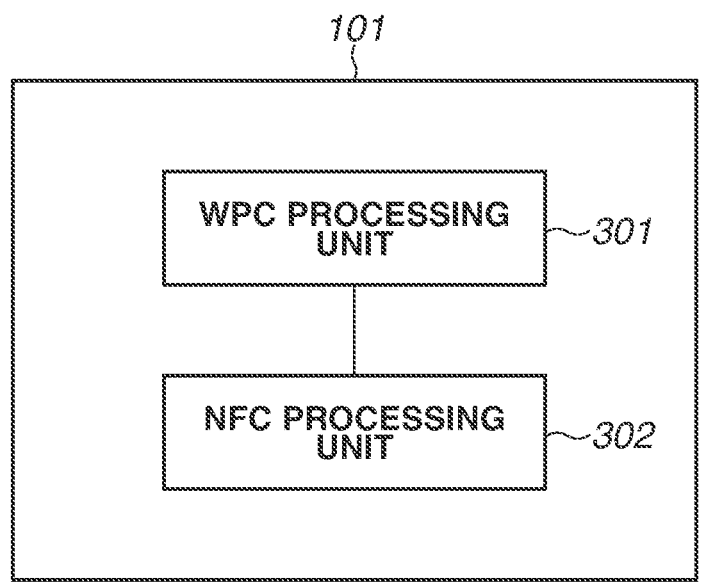
FIG. 3 is a diagram illustrating a functional block of the power transmitting apparatus according to an exemplary embodiment.

A function block diagram of the control unit 101 of the TX 100 will now be described with reference to FIG. 3. The control unit 101 includes a WPC processing unit 301 and an NFC processing unit 302. The WPC processing unit 301 is a processing unit that performs control communication of wireless power transmission based on the WPC standard, via the first communication unit 104. The WPC processing unit 301 controls the power transmitting unit 103, and controls power transmission to the RX 200. The NFC processing unit 302 is a processing unit that performs communication related to the standard of NFC, via the second communication unit 106. The WPC processing unit 301 and the NFC processing unit 302 concurrently operate as independent programs. The functions of the WPC processing unit 301 and the NFC processing unit 302 are executed by the programs being executed by the control unit 101.

Procedures of processing performed by the NFC processing unit 302 in the TX 100 and processing performed by the WPC processing unit 301 in the TX 100 will now be described with reference to FIGS. 4 and 5.

[Processing Performed by NFC Processing Unit]

FIG. 4 is a flowchart illustrating a processing operation of the NFC processing unit 302. The processing is continuously and repeatedly executed while the TX 100 is in an activated state.

In step S401, the second communication unit 106 starts NFC Polling processing when the TX 100 is activated. Specifically, the second communication unit 106 transmits a Polling request, and monitors the proximity of another NFC device by monitoring a response to the Polling request. If an error has been detected as a result of Polling processing (YES in step S402), the processing proceeds to step S403. In step S403, the NFC processing unit 302 notifies the WPC processing unit 301 that an error has occurred in NFC processing. The error means a failure in communication related to the standard of NFC, and does not include the result of no response to the Polling request i.e., nonexistence of an NFC device as a communication partner. An example of the error is a so-called collision error. In the collision error, response data cannot be properly received when a plurality of other NFC devices existing within a communication range of communication related to the standard of NFC makes a response at the same timing.

If such an error occurs, it cannot be checked whether detected NFC devices include an NFC tag driven without a battery, because NFC cannot be properly performed with another NFC device existing within the communication range. Thus, the NFC processing unit 302 notifies the WPC processing unit 301 of a possibility of proximity of an NFC tag, and the WPC processing unit 301 that has received the notification avoids performing power transmission processing with high power, thereby reducing the possibility of damaging the NFC tag.

If an error has not been detected as a result of Polling processing (NO in step S402), the processing proceeds to step S404. In step S404, the NFC processing unit 302 notifies the WPC processing unit 301 that no error has occurred in NFC processing. Even when the error has been resolved, the NFC processing unit 302 notifies that no error has occurred in NFC processing.

In step S405, the NFC processing unit 302 determines whether a specific response to the Polling request transmitted in step S401 has been received. The specific response is a response indicating that a device does not support the P2P mode. If the specific response has not been received (NO in step S405), the processing proceeds to step S406. In step S406, the NFC processing unit 302 notifies the WPC processing unit 301 that a specific NFC device does not exist nearby. The NFC processing unit 302 may notify that a specific NFC device does not exist nearby, only if the specific response to a plurality of consecutive Polling requests has not been received.

The specific NFC device is an NFC tag, a device that does not support the P2P mode, or a device that supports the P2P mode but is operating in the reader/writer mode. A device operating in the reader/writer mode does not make a response to a Polling request irrespective of whether the device supports the P2P mode. Thus, the NFC processing unit 302 determines as NO in step S405, if the NFC processing unit 302 cannot detect a device operating in the reader/writer mode, and only a device operating in the reader/writer mode is placed on the charging stand.

A case where a specific response has not been received includes the following cases: a case where a device performing communication related to the standard of NFC does not exist, a case where an NFC device exists but the NFC device does not make a response to a Polling request, and a case where a device makes a response to a Polling request but the device supports the P2P mode. The case where the device supports the P2P mode refers to a case where an NFC device is operable in the P2P mode. For example, a case where an NFC device supports the P2P mode even if the NFC device is operating in the card emulation mode also refers to the case where the NFC device supports the P2P mode. In a case where a device supports the P2P mode, response data to a Polling request includes information indicating that the P2P mode is supported. Thus, the NFC processing unit 302 can determine whether a detected NFC device supports the P2P mode, based on response data.

On the other hand, if a specific response has been received (YES in step S405), the NFC processing unit 302 repeats the processing in steps S407 to S411 the number of times corresponding to the number of received responses. In step S408, the NFC processing unit 302 acquires identifier information (hereinafter, sometimes referred to as "NFC identifier information") of each NFC device included in each piece of received response data. In this step, the NFC processing unit 302 acquires NFC identifier information of an NFC device that has made the response irrespective whether a response to a Polling request is a specific response. The NFC processing unit 302 can detect that an NFC device exists nearby, based on the presence or absence of a response.

The NFC identifier information is identifier information that makes another NFC device existing within an NFC communication range, uniquely identifiable. In the present exemplary embodiment, the NFC identifier information is IDm data used in the FeliCa® technique. The standard of NFC defines a region called IDm as a format of communication data, and defines content of data designated in the IDm region by the standard related to Felica. Thus, IDm data used in the FeliCa technique is used in the present exemplary embodiment. Nevertheless, the NFC identifier information is not limited to this as described below.

If NFC identifier information has been acquired (YES in step S409), the processing proceeds to step S410. In step S410, the NFC processing unit 302 notifies the WPC processing unit 301 of the acquired NFC identifier information. If NFC identifier information has failed to be acquired (NO in step S409), the processing proceeds to step S411. In step S411, the NFC processing unit 302 notifies the WPC processing unit 301 that an error has occurred in NFC processing.

After the identifier acquisition processing (steps S408 to 411) has been performed for NFC devices included in all pieces of response data, the NFC processing unit 302 compares NFC identifier information acquired in the previous NFC processing and NFC identifier information acquired in the current NFC processing. As a result of comparison, the processing proceeds to step S413, if there is any NFC identifier information that has not been acquired in the current NFC processing, among pieces of NFC identifier information acquired in the previous NFC processing (YES in step S412). In step S413, the NFC processing unit 302 notifies the WPC processing unit 301 of nonexistence of NFC identifier information and the NFC identifier information. If identifier acquisition has failed in the previous Polling processing, and identifier acquisition has not failed in the current Polling processing, the NFC processing unit 302 notifies the WPC processing unit 301 that an error of NFC processing has been resolved.

The NFC processing unit 302 sequentially notifies the WPC processing unit 301 of an error status of NFC processing and acquired NFC identifier information. However, the NFC processing is not limited to this. A notification to the WPC processing unit 301 may be collectively performed after all pieces of processing have been executed. The notification to the WPC processing unit 301 includes a notification of error occurrence (step S402), a notification of non-detection of response data (step S405), a notification of acquired NFC identifier information (step S410), and a notification of an acquisition failure of NFC identifier information (step S411). The acquired NFC identifier information may be made into a list, and the list may also be notified to the WPC processing unit 301.

[Processing Performed by WPC Processing Unit]

Figure 5B:
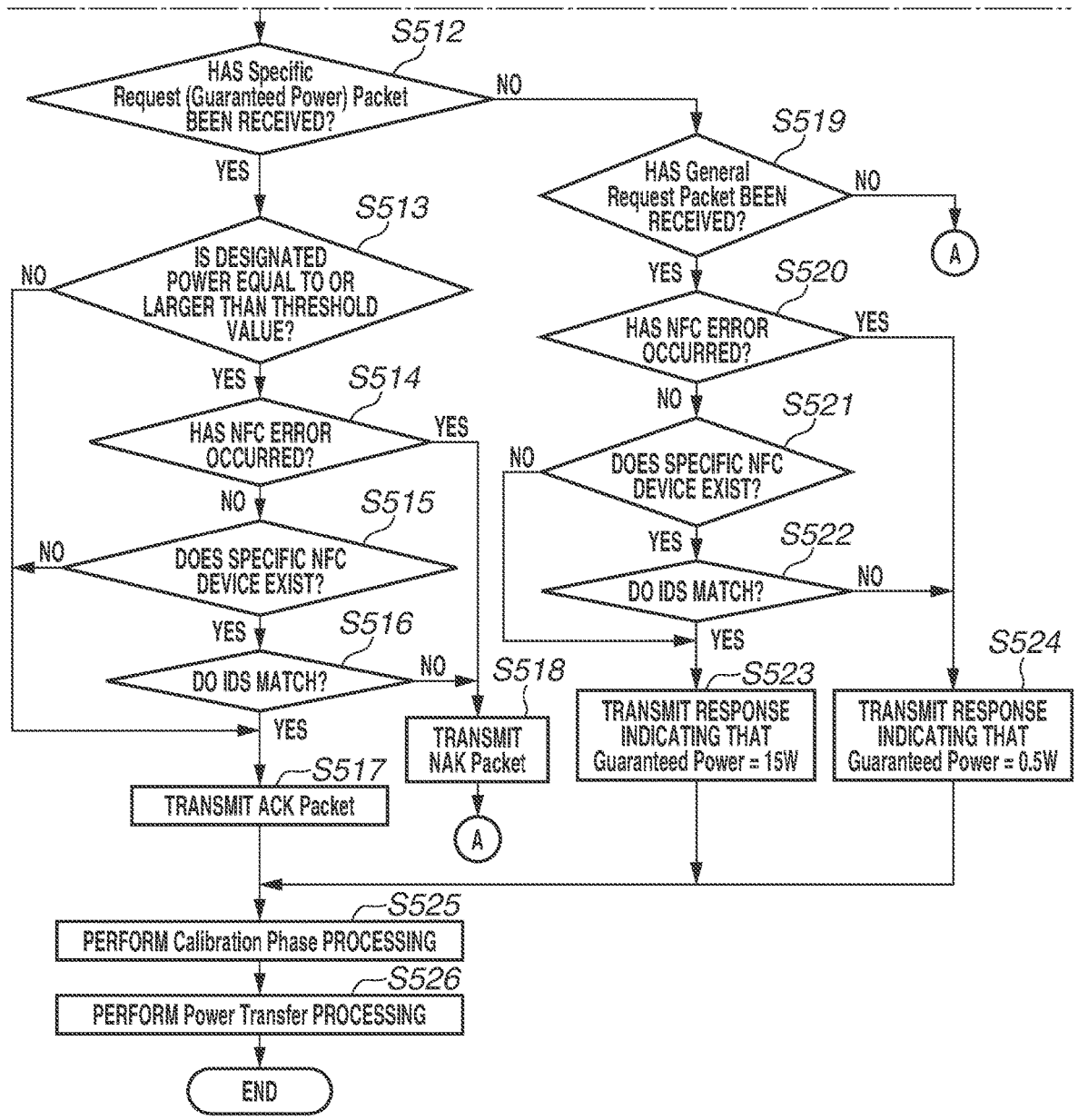
FIG. 5 (including FIG. 5A and FIG. 5B) is a flowchart illustrating processing in a WPC processing unit of the power transmitting apparatus.

FIG. 5 is a flowchart illustrating a processing operation of the WPC processing unit 301. The processing is also continuously and repeatedly executed while the TX 100 is in an activated state.

In step S501, the WPC processing unit 301 performs Selection phase processing after the TX 100 is activated.

Specifically, the WPC processing unit 301 transmits an Analog Ping via the power transmitting unit 103 and the power transmitting antenna 105. The TX 100 detects at least either one of a voltage value and a current value of the power transmitting antenna 105 that are obtained when the Analog Ping is transmitted. If a voltage value falls below a certain threshold value or if a current value exceeds a certain threshold value, the TX 100 determines that an object exists near the power transmitting antenna 105, and transitions to the Ping phase.

In Ping phase processing in step S502, the TX 100 transmits a Digital Ping lager than the Analog Ping. The magnitude of the Digital Ping is power sufficient for activating at least the control unit 201 of the RX 200 existing near the power transmitting antenna 105. When the TX 100 receives a received voltage notification for notifying the magnitude of received voltage from the RX 200, the TX 100 transitions to the I&C phase. The TX 100 recognizes that an object placed on the charging stand is the RX 200 by receiving the received voltage notification via the first communication unit 104.

In step S503, the TX 100 receives an ID Packet transmitted from the RX 200 in the I&C phase. In step S504, the TX 100 refers to an information bit (Ext bit) included in the ID Packet, and determines whether additional identifier information is to be transmitted from the RX 200.

If an Ext bit is 1 (YES in step S504), the TX 100 determines that additional identifier information is to be transmitted, and the processing proceeds to step S505. In step S505, the TX 100 waits for an Extended Identification Packet to be transmitted from the RX 200, and receives the Packet. The Packet includes an octet Extended Device Identifier of the RX 200 at most. In step S506, the TX 100 stores the additional identifier information into the memory 107 as NFC identifier information. In other words, the additional identifier information is stored into the memory 107 as NFC identifier information acquired in NFC processing unlike identifier information included in an ID Packet.

In step S507, the TX 100 receives a Configuration Packet transmitted from the RX 200. In step S508, the TX 100 refers to an information bit (Neg bit) included in the Packet, and determines whether to transition to the Negotiation phase.

In the Negotiation phase, the TX 100 negotiates with the RX 200 for determining the above-described GP. If the Neg bit is 0 (NO in step S508), the processing proceeds to step S509. In step S509, the TX 100 transmits an ACK Packet to the RX 200. At this time, in step S510, the TX 100 transitions to the Power Transfer phase without transitioning to the Negotiation phase, and executes power transmission processing with respect to the RX 200 with low power. The low power is a power transmission output value determined not to damage an NFC tag even if the TX 100 performs power transmission processing. The low power may be, for example, an arbitrarily-set value, or a value set based on at least one of power, current, and voltage defined by the WPC standard or another standard.

If the Neg bit is 1 (YES in step S508), the processing proceeds to step S511. In step S511, the TX 100 transmits an ACK Packet to the RX 200, and transitions to the Negotiation phase. In the processing in the Negotiation phase (steps S512 to S524), the TX 100 waits for a Specific Request Packet or a General Request Packet to be transmitted from the RX 200.

When the TX 100 receives a Specific Request Packet (YES in step S512), the TX 100 determines whether a value of GP designated in the Packet can be allowed (steps S513 to S518). The Specific Request Packet includes candidate values of power (GP) requested by the RX 200. In step S513, the TX 100 firstly determines whether the value of the designated GP is smaller than a preset threshold value. The threshold value herein is a threshold value of a power transmission output determined not to damage an NFC tag even if power transmission processing is performed. If the value of the designated GP is smaller than the threshold value (NO in step S513), the processing proceeds to step S517. In step S517, the TX 100 allows the value of the designated GP, and transmits an ACK Packet to the RX 200.

If the value of the designated GP is equal to or larger than the threshold value (YES in step S513), the processing proceeds to step S514. In step S514, the TX 100 determines whether an error has occurred in NFC processing. Specifically, the WPC processing unit 301 determines whether the occurrence of an error has been notified from the NFC processing unit 302 (step S413 or S411 in FIG. 4). If an error has occurred in NFC processing (YES in step S514), there is a possibility that an NFC tag exists within the communication range of the TX 100. Thus, in step S518, the TX 100 refuses the value of requested GP that is equal to or larger than the threshold value, and transmits a Negative Acknowledgement (NAK) Packet to the RX 200. Thereafter, the TX 100 continues to wait for a Specific Request Packet or a General Request Packet.

If an error has not occurred in NFC processing, for example (NO in step S514), the processing proceeds to step S515. In step S515, the TX 100 determines the presence or absence of an NFC device that has made a specific response to a Polling request. Specifically, the TX 100 performs the determination based on whether the NFC processing unit 302 notifies the WPC processing unit 301 that a specific NFC device does not exist (step S406 in FIG. 4).

If a specific NFC device that has made a response to a Polling request does not exist (NO in step S515), the processing proceeds to step S517. In step S517, the TX 100 allows the value of the designated GP, and transmits an ACK Packet to the RX 200.

If a specific NFC device that has made a response to a Polling request exists (YES in step S515), the processing proceeds to step S516. In step S516, the TX 100 determines whether an NFC device detected in NFC processing and the RX 200 detected in WPC processing are the same devices. Specifically, the WPC processing unit 301 compares NFC identifier information notified from the NFC processing unit 302, and additional identifier information stored in the processing in step S506, and determines whether these pieces of identifier information match. If the pieces of identifier information match, the WPC processing unit 301 determines that an NFC device detected in NFC processing and the RX 200 detected in WPC processing are the same devices.

If the WPC processing unit 301 determines that an NFC device detected in NFC processing and the RX 200 detected in WPC processing are the same devices (YES in step S516), the processing proceeds to step S517. In step S517, the TX 100 allows the value of the designated GP, and transmits an ACK Packet to the RX 200. In this case, the TX 100 determines that the RX 200 includes a power source for executing communication processing of WPC, and power of some sort is supplied to a module of the RX 200 that executes an NFC function. The TX 100 therefore determines that an NFC device detected by the NFC processing unit 302 is not damaged even if power transmission processing is performed with an output that is equal to or larger than the threshold value, and allows the value of the GP designated by the RX 200.

If an NFC device detected in NFC processing and the RX 200 detected in WPC processing are not the same devices (NO in step S516), the processing proceeds to step S518. In step S518, the TX 100 refuses the value of requested GP that is equal to or larger than the threshold value, and transmits a NAK Packet to the RX 200. Since an NFC tag is not the RX 200, WPC processing as illustrated in FIG. 5 is not executed, and NFC identifier information is not transmitted to the TX 100. It is thereby determined that an NFC device detected in NFC processing and the RX 200 detected in WPC processing are not the same devices. Thereafter, the TX 100 continues to wait for a Specific Request Packet or a General Request Packet.

If a plurality of pieces of NFC identifier information is notified from the NFC processing unit 302, in step S518, the TX 100 transmits a NAK Packet to the RX 200 unless otherwise corresponding additional identifier information is stored for all pieces of NFC identifier information in the processing performed in step S506. In other words, if additional identifier information corresponding to any of a plurality of identifiers notified from the NFC processing unit 302 is not stored in step S506, the TX 100 transmits a NAK Packet to the power receiving apparatus 200. In contrast, if corresponding additional identifier information is stored in the processing in step S506 for all pieces of NFC identifier information notified from the NFC processing unit 302, in step S517, the TX 100 transmits an ACK Packet to the RX 200.

A case where the TX 100 receives a General Request Packet will now be described. The TX 100 receives a Packet for requesting the capability of the TX 100 (Power Transmitter capability) to be notified, among General Request Packets (NO in step S512, and YES in step S519). In this case, the TX 100 performs determination processing for determining a value of GP to be notified to the RX 200 in a response Packet of the Packet (steps S520 to S524).

In step S520, the TX 100 firstly determines whether an error has occurred in NFC processing. The determination method is the same as that used in the processing in step S514. If an error has occurred in NFC processing (YES in step S520), the processing proceeds to step S524. In step S524, the TX 100 transmits a response indicating that a GP value is a power transmission output value that can be determined not to damage an NFC tag even if power transmission processing is performed. In this step, the TX 100 transmits a response indicating that GP=0.5 watts. The value of GP is not limited to 0.5 watts, and is only required to be a power value that does not damage an NFC tag. In addition, the value of GP may be zero watts, or the RX 200 may be notified that power transmission is not to be performed.

If an error has not occurred in NFC processing (NO in step S520), the processing proceeds to step S521. In step S521, the TX 100 determines the presence or absence of a specific NFC device that has made a response to a Polling request. The determination method is the same as that used in the processing in step S515. If a specific NFC device that has made a response to a Polling request does not exist (NO in step S521), the processing proceeds to step S523. In step S523, the TX 100 transmits a response indicating that a GP value is the largest power transmission output value defined by the WPC standard, among the capabilities of the power transmitting unit 103. In this step, the TX 100 transmits a response indicating that GP=15 watts. The value of GP is an example, and is not limited to this.

If a specific NFC device that has made a response to a Polling request exists (YES in step S521), the processing proceeds to step S522. In step S522, the TX 100 determines whether an NFC device detected in NFC processing and the RX 200 detected in WPC processing are the same devices. The determination method is the same as that used in the processing in step S516.

If it is determined that an NFC device detected in NFC processing and the RX 200 detected in WPC processing are the same devices (YES in step S522), the processing proceeds to step S523. In step S523, the TX 100 transmits a response indicating that a GP value is the largest power transmission output value defined by the WPC standard, among the capabilities of the power transmitting unit 103. In contrast, if it is determined that an NFC device detected in NFC processing and the RX 200 detected in WPC processing are not the same devices (NO in step S522), the processing proceeds to step S524. In step S524, the TX 100 transmits a response indicating that a GP value is a power transmission output value that can be determined not to damage an NFC tag even if power transmission processing is performed. In other words, if it is determined that an NFC device detected in NFC processing and the RX 200 detected in WPC processing are the same devices, the TX 100 sets lager GP as compared with a case where it is determined that the an NFC device and the RX 200 are not the same devices, and performs power transmission based on the GP.

In step S525, if the TX 100 receives a Specific Request Packet for requesting an end of the Negotiation phase from the RX 200, the TX 100 transitions to the Calibration phase. In the Calibration phase, the TX 100 determines parameters necessary for a foreign object detection function of detecting that an object different from the RX 200 exists near the power receiving antenna 205. The TX 100 adjusts a power transmission output such that the RX 200 can perform charging using the GP allowed in step S517, or the GP included in the response transmitted in step S523 or S524.

Thereafter, the TX 100 transitions to the Power Transfer phase (step S526), and supplies power to the charging unit 206 of the RX 200. The TX 100 continues power transmission processing until receiving an End Power Transfer Packet from the RX 200.

[WPC Processing in RX]

An operation procedure of WPC processing in the RX 200 will now be described with reference to FIG. 8. The processing is repeatedly executed while a setting of executing a charging function based on WPC is set in the RX 200.

If the control unit 201 of the RX 200 receives the Digital Ping transmitted from the TX 100 (YES in step S801), the processing proceeds to step S802. In step S802, the control unit 201 detects that the TX 100 exists nearby. Upon detecting the existence, in step S803, the control unit 201 acquires NFC setting/operation information in the second communication unit 202. The setting/operation information includes a state indicating whether an NFC function in the RX 200 is enabled or disabled, an operation mode of NFC, and NFC identifier information that makes an NFC device uniquely identifiable as an NFC device. The operation mode of NFC indicates an operation mode of NFC in the second communication unit 202, and indicates any one mode of the following three modes: the card emulation mode, the reader/writer mode, and the P2P mode. In step S804, the control unit 201 subsequently notifies the TX 100 of received voltage of the Digital Ping via the first communication unit 204 using a Signal Strength Packet.

In step S805, the control unit 201 selects a Packet to be transmitted next, in accordance with the NFC communication setting/operation information acquired in step S803. Specifically, if the NFC function is enabled and an operation mode of NFC is the card emulation mode (YES in step S805), the processing proceeds to step S807. In step S807, the control unit 201 transmits an ID Packet to the TX 100. The control unit 201 sets an Ext bit to 1 in the ID Packet transmitted in this step, and notifies the TX 100 that an Extended Identification Packet is to be subsequently transmitted.

In step S808, the control unit 201 subsequently sets the NFC identifier information acquired in step S803 in the Extended Identification Packet, and transmits the Extended Identification Packet to the TX 100.

If the NFC function is disabled or if the NFC function is enabled but an operation mode is other than the card emulation mode (NO in step S805), the control unit 201 does not transmit an Extended Identification Packet. In other words, in step S806, the control unit 201 transmits an Identification Packet in which an Ext bit is set to 0, to the TX 100. In this manner, it becomes possible to suppress unnecessary communication by determining whether to transmit a Packet, in accordance with an operation state of the NFC function in the RX 200. Power consumption in both the TX 100 and the RX 200 can thereby be reduced.

In step S809, the control unit 201 transmits a Configuration Packet to the TX 100, and transmits, to the TX 100, a request to transition to the Negotiation phase in which negotiation for determining GP is performed. When the RX 200 receives an ACK Packet from the TX 100 (YES in step S810), the RX 200 transitions to the Negotiation phase. If the RX 200 has not received an ACK Packet for a certain period of time (NO in step S810), the RX 200 transitions to the Selection phase, and returns a processing state to waiting processing for a Digital Ping.

If the RX 200 transitions to the Negotiation phase, in step S811, the control unit 201 transmits a Specific Request Packet in which 15 watts is designated as a candidate of GP, to the TX 100. When the RX 200 receives an ACK Packet from the TX 100 (YES in step S812), the processing proceeds to step S813. In step S813, the RX 200 determines that a 15-watt GP has been allowed by the TX 100, and GP in power receiving processing is determined to be 15 watts.

In addition, if the RX 200 receives a NAK Packet from the TX 100 (NO in step S812, and YES in step S814), the RX 200 determines that the 15-watt GP has been refused by the TX 100. In this case, the RX 200 transmits, in step S815, a General Request Packet to the TX 100, and requests a GP candidate in the TX 100. In step S816, the RX 200 receives a Power Transmitter Capability Packet from the TX 100. In step S817, a value of the GP candidate in the TX 100 t included in the Power Transmitter Capability Packet is determined to be GP used in the current charging processing.

If the RX 200 receives neither an ACK Packet nor a NAK Packet (NO in step S814), the RX 200 transitions to the Selection phase, and returns a processing state to waiting processing for a Digital Ping.

When negotiation of GP ends, in step S818, the TX 100 and the RX 200 transition to the Calibration phase. In the Calibration phase, the TX 100 determines parameters necessary for a foreign object detection function of detecting that an object different from the RX 200 exists near the power receiving antenna 205. In addition, in the Calibration phase, the RX 200 also performs processing of supplying power to the charging unit 206 serving as a load, from the power receiving unit 203.

Thereafter, in step S819, the TX 100 and the RX 200 transition to the Power Transfer phase, and the RX 200 charges the battery 207. When the charging ends (YES in step S820), the processing proceeds to step S821. In step S821, the RX 200 transmits an End Power Transfer Packet to the TX 100, and notifies the TX 100 of an end of charging processing.

[Sequence of Wireless Power Transmitting System]

Figure 6:
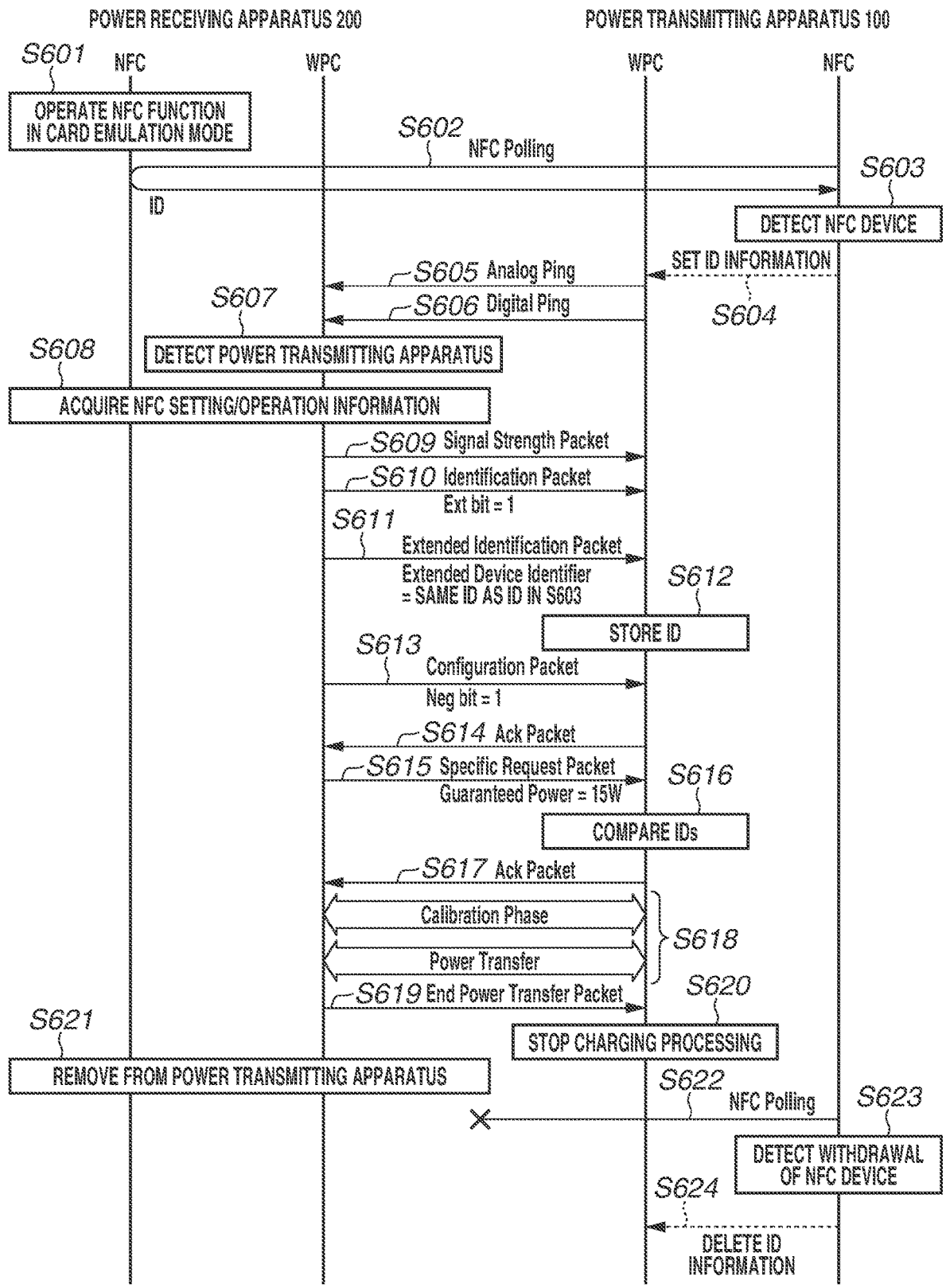
FIG. 6 is an operation sequence diagram of a wireless power transmitting system according to an exemplary embodiment.

A sequence of a wireless power transmitting system including the TX 100 and the RX 200 will now be described with reference to FIG. 6. FIG. 6 illustrates an example of a communication sequence between the TX 100 and the RX 200 that is performed when the RX 200 is brought closer to the TX 100.

In step S601, the RX 200 firstly operates the NFC function of the second communication unit 202 in the card emulation mode.

In contrast, in step S602, the NFC processing unit 302 of the TX 100 periodically executes Polling processing based on the standard of NFC. If the RX 200 comes close to the inside of an NFC communication range, the RX 200 makes a response to a Polling request, and in step S603, the NFC processing unit 302 detects that an NFC device has come close. In step S604, the NFC processing unit 302 reads NFC identifier information from the response to the Polling request, and notifies the WPC processing unit 301 of the NFC identifier information.

In step S605, the WPC processing unit 301 of the TX 100 periodically transmits an Analog Ping, and if the WPC processing unit 301 determines that an object exists near the power transmitting antenna 105, in step S606, the WPC processing unit 301 transmits a Digital Ping.

In step S607, the RX 200 detects the TX 100 by receiving the Digital Ping. In step S608, the RX 200 then acquires NFC setting/operation information. The NFC setting information herein includes state information indicating whether the NFC function of the RX 200 is enabled or disabled, an operation mode of NFC, and NFC identifier information. In this example, the following information is acquired: "NFC function=enabled", "operation mode=card emulation mode", and "NFC identifier information=IDm information of Felica". In step S609, the RX 200 notifies the TX 100 of received voltage of a Digital Ping using a Signal Strength Packet, and transitions to the I&C phase.

In step S610, the RX 200 subsequently transmits an ID Packet to the TX 100. In step S611, the RX 200 further transmits an Extended Identification Packet to the TX 100. The Extended Identification Packet includes NFC identifier information stored in step S602. In step S611, the TX 100 receives the Extended Identification Packet. In step S612, the TX 100 stores identifier information included in the Extended Identification Packet.

In step S613, the RX 200 transmits a Configuration Packet to the TX 100. The Configuration Packet includes information indicating that a Neg bit is set to 1. When the TX 100 responds with an ACK Packet in step S614, the RX 200 transitions to the Negotiation phase, accordingly.

When the RX 200 transitions to the Negotiation phase, in step S615, the RX 200 transmits a Specific Request Packet to the TX 100. In this example, the RX 200 designates GP=15 watts in the Specific Request Packet. If the WPC processing unit 301 of the TX 100 receives the Packet, in step S616, the WPC processing unit 301 compares the NFC identifier information designated in step S605, and the identifier information stored in step S612. In this example, the pieces of identifier information match. In step S617, the WPC processing unit 301 transmits an ACK Packet to the RX 200, and allows the GP designated in step S615.

If the Negotiation phase ends, in step S618, the TX 100 and the RX 200 transition to the Calibration phase and the Power Transfer phase. The TX 100 then starts charging processing with respect to the RX 200. The TX 100 performs charging processing with an output that enables the charging unit 206 of the RX 200 to receive 15-watt power.

When power reception of the charging unit 206 ends, in step S619, the RX 200 transmits an End Power Transfer Packet to the TX 100. In step S620, the TX 100 stops charging processing with respect to the RX 200 upon receiving the End Power Transfer Packet. In step S621, the RX 200 is removed from the TX 100. In step S622, a response to Polling processing performed by the NFC processing unit 302 becomes inexecutable. In step S623, the NFC processing unit 302 thereby detects that the NFC device has withdrawn from the inside of the communication range. In step S624, the NFC processing unit 302 notifies the WPC processing unit 301 that NFC identifier information notified in step S605 is to be deleted. Upon receiving the notification, the WPC processing unit 301 deletes the stored NFC identifier information.

Figure 7:
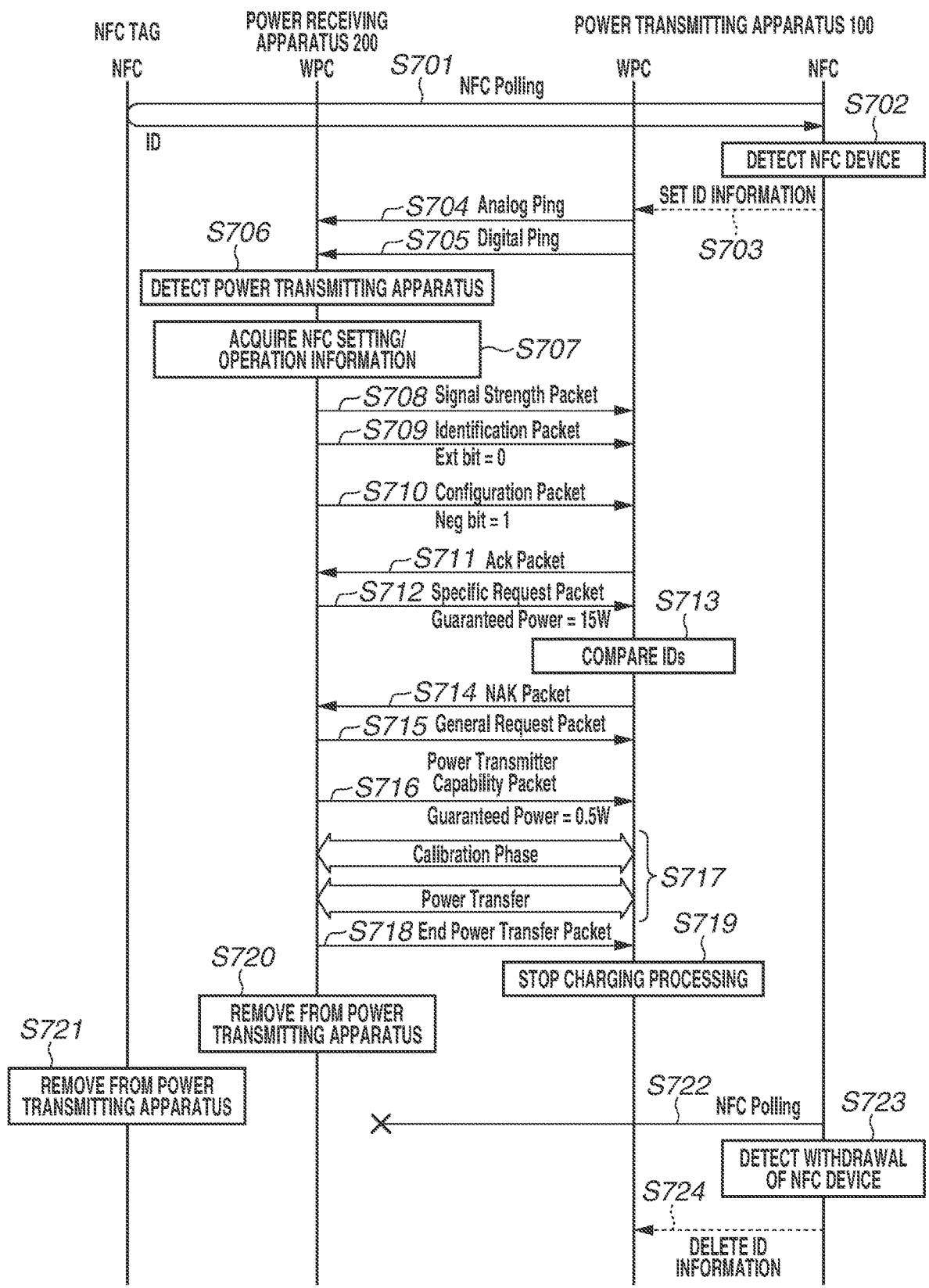
FIG. 7 is an operation sequence diagram of a wireless power transmitting system according to an exemplary embodiment.

FIG. 7 illustrates an example of a communication sequence between the TX 100, the RX 200, and an NFC tag that is performed when both of the NFC tag and the RX 200 including a disabled NFC function are brought closer to the TX 100. The RX 200 may be an apparatus not including an NFC function.

In step S701, the NFC processing unit 302 of the TX 100 periodically executes NFC Polling processing similarly to the description for FIG. 6. If the NFC tag comes close to the inside of a communication range of communication related to the standard of NFC, a response to Polling is made. In step S702, the NFC processing unit 302 detects that a device supposed to be an NFC tag has come close. In step S703, the NFC processing unit 302 reads NFC identifier information from the response to Polling, and notifies the WPC processing unit 301 of the NFC identifier information.

The processing performed in steps S704 to S709 is similar to the processing in steps S605 to S610 illustrated in FIG. 6, and therefore the description will be omitted. Nevertheless, the RX 200 does not transmit an Extended Identification Packet in the processing illustrated in FIG. 7. In other words, processing corresponding to the processing of steps S611 and S612 illustrated in FIG. 6 is not performed. Further, the processing in steps S710 to S712 is similar to the processing in steps S613 to S615 in FIG. 6, and thus the description will be omitted.

In step S712, the WPC processing unit 301 of the TX 100 receives a Specific Request Packet. In step S713, the WPC processing unit 301 then compares NFC identifier information designated in step S703 and additional identifier information acquired through WPC communication. Since an Extended Identification Packet has not been received in the processing in FIG. 7, additional identifier information acquired through WPC communication does not exist. Thus, the NFC identifier information notified from the NFC processing unit 302 and additional identifier information acquired through WPC communication do not match. In step S714, the WPC processing unit 301 transmits a NAK Packet to the RX 200, and refuses the GP designated in step S712, accordingly.

In step S715, the RX 200 that has received the NAK Packet transmits a General Request Packet to the TX 100, and requests GP value information of the TX 100. In step S716, the TX 100 transmits, to the RX 200, a Power Transmitter Capability Packet indicating GP=0.5 watts in response to the General Request Packet.

When the Negotiation phase ends, in step S717, the TX 100 and the RX 200 transition to the Calibration phase and the Power Transfer phase, and the TX 100 starts charging processing with respect to the RX 200. The TX 100 performs charging processing with an output that enables the charging unit 206 of the RX 200 to receive 0.5-watt power.

When power reception of the charging unit 206 ends, in step S718, the RX 200 transmits an End Power Transfer Packet to the TX 100. Upon receiving the End Power Transfer Packet, in step S719, the TX 100 stops charging processing with respect to the RX 200.

Unlike the processing in FIG. 6, the NFC processing unit 302 does not notify the WPC processing unit 301 that NFC identifier information is to be deleted even if the RX 200 is removed from the TX 100 in step S720, because the NFC processing unit 302 detects an NFC tag. Thereafter, in step S721, the NFC tag is removed from the TX 100. In step S722, a response to Polling processing performed by the NFC processing unit 302 becomes inexecutable. In step S723, the NFC processing unit 302 thereby detects that the NFC device has withdrawn from the inside of the communication range. In step S724, the NFC processing unit 302 notifies the WPC processing unit 301 that NFC identifier information notified in step S703 is to be deleted. Upon receiving the notification, the WPC processing unit 301 deletes the stored NFC identifier information.

(Example of Power Transmission Control in Specific Cases)

Power transmission control in the following cases (1) to (3) will be described.

(1) Case where NFC Tag is Included as NFC Device

An NFC tag makes a response to Polling processing. Furthermore, since the NFC tag does not support the P2P mode, the NFC processing unit 302 determines that a specific response has been received (YES in step S405). In step S408, the NFC processing unit 302 subsequently acquires NFC identifier information from the NFC tag, and in step S410, notifies the WPC processing unit 301 of the acquired NFC identifier information. Furthermore, in step S408, the NFC processing unit 302 acquires NFC identifier information also from the NFC device, if there is an NFC device that has made a response to Polling processing, in addition to the NFC tag. In step S410, the NFC processing unit 302 notifies the WPC processing unit 301 of the acquired NFC identifier information.

Figure 8:
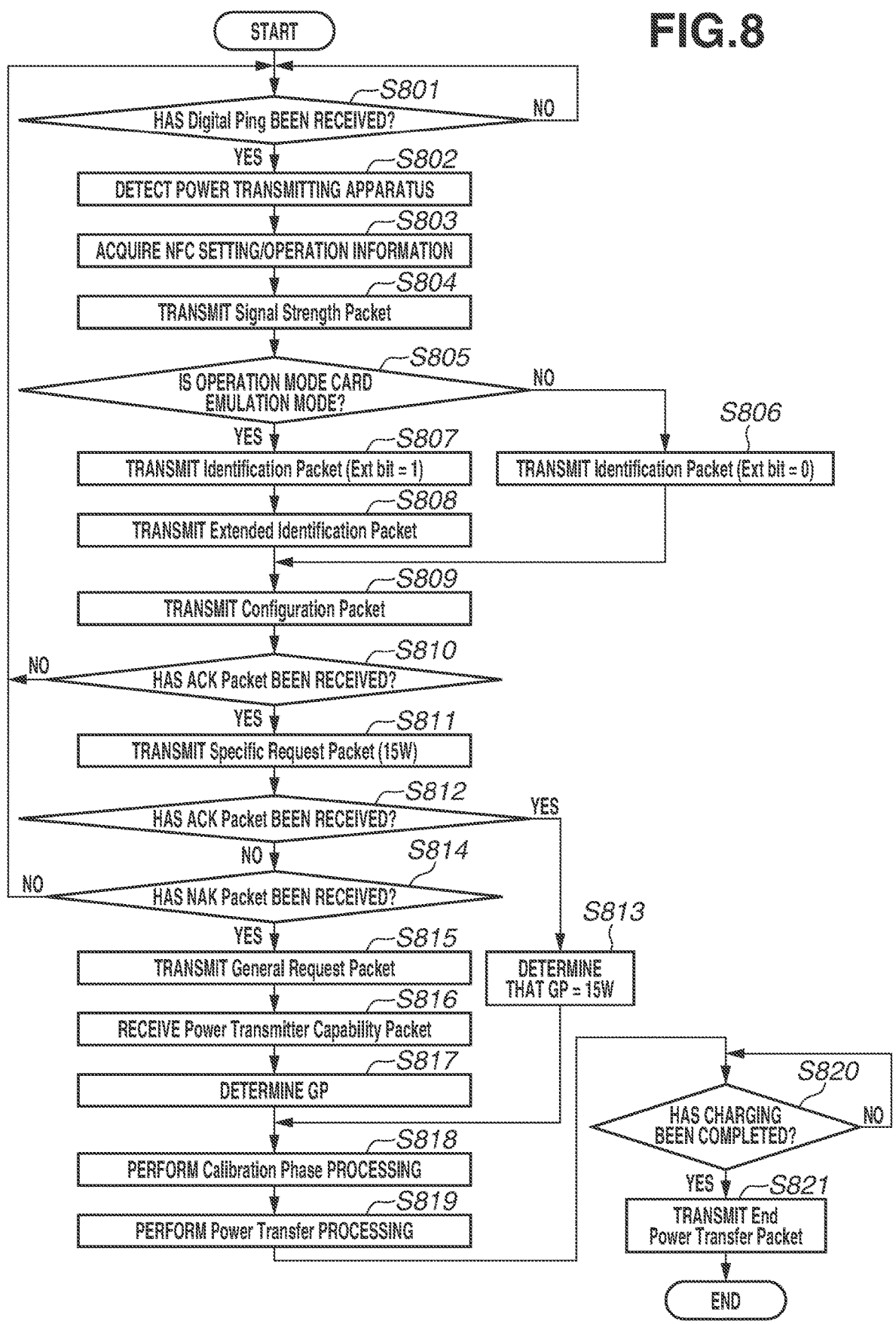
FIG. 8 is a flowchart illustrating WPC processing in the power receiving apparatus according to an exemplary embodiment.

In contrast, the NFC tag is not the RX 200, and thus the processing illustrated in FIG. 8 is not performed. The WPC processing unit 301 therefore does not acquire NFC identifier information of the NFC tag in the WPC processing illustrated in FIG. 5. Thus, it is determined as NO in step S516 or S522 in FIG. 5, and the TX 100 can restrict power transmission. For example, the TX 100 performs power transmission using only 0.5-watt power indicated by the response transmitted in step S524. Alternatively, power transmission from the TX 100 may be prevented from being performed.

(2) Case where Only RX Supporting P2P Mode is Included as NFC Device

In this case, an NFC device makes a response to Polling processing using response data including information indicating that the P2P mode is supported, or does not make a response. The NFC device that does not make a response is the RX 200 operating in the reader/writer mode.

Thus, the NFC processing unit 302 determines that a specific response has not been received (NO in step S405). In step S406, the NFC processing unit 302 notifies the WPC processing unit 301 that a specific NFC device does not exist, accordingly. In step S408, the NFC processing unit 302 acquires NFC identifier information from an NFC device that has made a response, and in step S410, notifies the WPC processing unit 301 of the acquired NFC identifier information.

In contrast, since the WPC processing unit 301 is notified that a specific NFC device does not exist, it is determined as YES in step S515 or S522 illustrated in FIG. 5. The TX 100 then allows the requested power and power transmission with 15-watt power.

(3) Case where NFC Tag is not Included as NFC Device, and NFC Device not Supporting P2P Mode is Included as NFC Device This case is further separated in the following manner.

(3-1) Case where Only RX not Supporting P2P Mode and Operating in Card Emulation Mode is Included as NFC Device In this case, an NFC device makes a response to Polling processing. Nevertheless, the response does not include information indicating that the P2P mode is supported. The NFC processing unit 302 therefore determines that a specific response has been received (YES in step S405). In step S408, the NFC processing unit 302 acquires NFC identifier information from the NFC device, and in step S410, notifies the WPC processing unit 301 of the acquired NFC identifier information.

In contrast, since this NFC device is operating in the card emulation mode, the NFC device notifies the TX 100 of NFC identifier information (YES in step S805, step S807, and step S808).

The TX 100 therefore determines as YES in step S515 illustrated in FIG. 5. Furthermore, the TX 100 determines as YES in step S516. Alternatively, the TX 100 determines as YES in step S521 illustrated in FIG. 5. Furthermore, the TX 100 determines as YES in step S522. The TX 100 allows the requested power and power transmission with 15-watt power, accordingly.

(3-2) Case where Both RX not Supporting P2P Mode and Operating in Card Emulation Mode and RX Operating in Reader/Writer Mode are Included as NFC Devices In this case, while an RX operating in the reader/writer mode does not make a response to Polling processing, an RX operating in the card emulation mode makes a response. Since the response does not include information indicating that the P2P mode is supported, the NFC processing unit 302 determines that a specific response has been received (YES in step S405). Since no response is received from the RX operating in the reader/writer mode, in step S408, the NFC processing unit 302 acquires NFC identifier information only from the RX operating in the card emulation mode. In step S410, the NFC processing unit 302 then notifies the WPC processing unit 301 of the acquired NFC identifier information.

In contrast, the RX operating in the card emulation mode notifies the TX 100 of additional identifier information (YES in step S805, step S807, and step S808). Nevertheless, the RX operating in the reader/writer mode does not notify the TX 100 of additional identifier information (NO in step S805, and step S806).

The TX 100 therefore acquires the same identifier information from the RX operating in the card emulation mode by using the WPC processing unit 301 and the NFC processing unit 302 only. The TX 100 thus determines as YES in step S515 illustrated in FIG. 5. Furthermore, the TX 100 determines as YES in step S516. Alternatively, the TX 100 determines as YES in step S521 illustrated in FIG. 5. Furthermore, the TX 100 determines as YES in step S522. The TX 100 allows the requested power and power transmission with 15-watt power, accordingly.

(3-3) Case where Only RX not Supporting P2P Mode and Operating in Reader/Writer Mode is Included as NFC Device Since an RX operating in the reader/writer mode does not make a response to Polling processing, the NFC processing unit 302 determines that a specific response has not been received (NO in step S405). In step S406, the NFC processing unit 302 notifies the WPC processing unit 301 that a specific NFC device does not exist, accordingly. Since an NFC device that has made a response does not exist, the NFC processing unit 302 does not acquire NFC identifier information.

In contrast, the WPC processing unit 301 is notified that a specific NFC device does not exist, it is therefore determined as YES in step S515 or S522 illustrated in FIG. 5. The TX 100 thus allows the requested power and power transmission with 15-watt power.

(Effect)

As described above, by the TX 100 and the RX 200 including the above-described configurations, it is possible to protect an NFC tag driven without a battery, and perform high-output power transmission processing with respect to an RX having an NFC module operating in the card emulation mode.

In the above-described exemplary embodiment, an NFC processing unit always stores NFC identifier information of an NFC device that has made a response to Polling. If NFC identifier information becomes nonexistent (YES in step S412), that is to say, if an NFC device is removed, in step S413, the WPC processing unit 301 is notified of nonexistence of NFC identifier information. In a similar manner, the WPC processing unit 301 is notified of the resolution when an error of NFC processing has been resolved. With such a configuration, an additional effect can be expected, when an NFC tag is placed on the charging stand of the TX 100 or an NFC tag is removed from the charging stand while the RX 200 is performing charging. In other words, GP can be dynamically changed depending on the presence or absence of an NFC tag, and charging can be continued, even when the RX 200 is performing charging by receiving power from the TX 100.

Specifically, the NFC processing unit 302 notifies the WPC processing unit 301 that NFC identifier information has become nonexistent, or an error has been resolved, if charging of the RX 200 is performed in a state in which the TX 100 restricts GP as described in step S524. The WPC processing unit 301 then recognizes that a cause for restriction of GP has been resolved, when the WPC processing unit 301 receives a notification. The TX 100 therefore transmits a GP re-negotiation request to the RX 200, transitions to a Re-negotiation phase defined by the WPC standard, and performs re-negotiation for GP. Since the reason for restriction of GP has been resolved at the time point, in step S523, the TX 100 can transmit a response indicating that a GP value is the largest power transmission output value defined by the WPC standard, among the capabilities of the power transmitting unit 103.

Further, the WPC processing unit 301 sequentially updates whether an NFC tag exists, and it is therefore possible to avoid restricting GP as the WPC processing unit 301 erroneously recognizes that an NFC tag exists although an NFC device becomes nonexistent. In addition, it is possible to avoid performing power transmission with high power without restricting GP as the WPC processing unit 301 erroneously recognizes that an NFC tag does not exist although the NFC processing unit 302 newly detects an NFC device.

The above-described exemplary embodiment is an example of a typical exemplary embodiment, but the present exemplary embodiment is not limited to the exemplary embodiment described in the specification and the drawings. The present exemplary embodiment may be appropriately implemented in a changed way without departing from the gist thereof.

(Modified Example Related to Identifier Information)

In the present exemplary embodiment, IDm data defined by the standard related to Felica has been exemplified as NFC identifier information exchanged between the TX 100 and the RX 200. Nevertheless, the NFC identifier information is not limited, in the present exemplary embodiment. The NFC identifier information is only required to be information that can uniquely identify a plurality of NFC devices existing within the range of communication based on the standard of NFC of the TX 100 and WPC communication. For example, the NFC identifier information may be a unique identifier (UID) defined by the standard related to MIFARE®, or may be a media access control (MAC) address or a universally unique identifier (UUID) of an RX.

In addition, a value calculated by hash calculation based on all or a part of NFC Polling response data, or a part at least including identifier information of a transmission source of Polling response data may be used as identifier information. In this case, the TX 100 performs hash calculation on NFC Polling response data received by the NFC processing unit 302, and notifies the WPC processing unit 301 of the calculated value as identifier information. In contrast, the RX 200 performs the same hash calculation as the TX 100 performs on data read as NFC Polling response data, and notifies the TX 100 of the calculated value through WPC communication.

In addition, the RX 200 may include identifier information of the RX 200 defined by the WPC standard, in response data to NFC Polling processing, and the TX 100 may acquire the identifier information. For example, Extended Device Identifier information included in an Extended Identification Packet may be regarded as response data of NFC Polling.

Further, identifier information notified from the RX 200 serving as an NFC device in WPC processing may also be identifier information notified from the RX 200 in an ID Packet. In this case, an Extended Identification Packet may include identifier information notified in an ID Packet, in WPC processing of the RX 200.

Identifier information notified from the RX 200 serving as an NFC device in WPC processing may have the following configuration if the identifier information is identifier information notified from the RX 200 in an ID Packet. In other words, an Extended Identification Packet may not be notified. In this case, the WPC processing unit 301 of the TX 100 may compare identifier information included in an ID Packet notified from the RX 200, and NFC identifier information notified from the NFC processing unit 302. The NFC identifier information notified from the NFC processing unit 302 is identifier information included in an ID Packet.

Furthermore, the RX 200 may perform hash calculation based on all or a part of an Extended Device Identifier, and transmit the calculated value as a NFC Polling response. In this case, the WPC processing unit 301 of the TX 100 performs the same hash calculation, as the RX 200 performs, on identifier information of the RX 200 included in the received Extended Identification Packet. The TX 100 may then compare the result of hash calculation and a value received as a Polling response.

The above-described hash calculation is only required to be performed by any one of the NFC processing unit 302 of the TX 100, the WPC processing unit 301 of the TX 100, and another processing unit (not illustrated) of the control unit 101.

In the present exemplary embodiment, identifier information of the RX 200 has been described as Extended Device Identifier information included in an Extended Identification Packet. Nevertheless, identifier information of the RX 200 may be another piece of identifier information defined by the WPC standard. Specifically, another piece of identifier information may be Basic Device Identifier information included in an Identification Packet. Even when another piece of identifier information is Wireless Power ID (WPID) information included in a Wireless Power Identification Packet defined by the WPC standard, a similar effect can be obtained.

If the RX 200 operates an NFC function in a plurality of categories (Types A/B/F) defined by the standard of NFC, data obtained by connecting pieces of NFC identifier information that are designated in the respective Types may be used as identifier information. With this configuration, even when the RX 200 operates the card emulation mode of NFC in a plurality of categories, the TX 100 can determine whether an identifier acquired in each category is an identifier of the RX 200.

In addition, as a method by which the TX 100 acquires identifier information of the RX 200 in WPC communication, identifier information may be acquired using another message packet defined by the WPC standard, or an extended message not described in the standard, instead of using a Packet described in the above-described present exemplary embodiment. Furthermore, identifier information of the RX 200 may be acquired using a communication tool, such as a wireless LAN, Bluetooth®, Zigbee®, Infrared Data Association (IrDA), or a Wireless USB.

(Modified Example Related to NFC Processing)

In the present exemplary embodiment, a method of determining the presence or absence of a response to a Polling request has been described, as a method by which the TX 100 detects an approaching NFC device. However, a method other than this may be used. Further, it may also be determined whether an approaching NFC device is an NFC tag (or NFC module operating in the card emulation mode) by using additional NFC processing. For example, different message processing of an NFC function may be executed subsequent to Polling processing, and it may be determined whether read data of NFC changes. If the read data changes, it may be determined that the detected NFC device is not an NFC tag. If response data acquired in Polling processing includes an information element indicating that an NFC device is not an NFC tag, it may be determined that the detected NFC device is not an NFC tag. The NFC device determined not to be an NFC tag in this manner is excluded from an NFC device of which identifier information is to be notified to the WPC processing unit 301. With this configuration, it becomes possible to perform high-output power transmission processing with respect to the RX 200, such as a smartphone, in which processing of transmitting identifier information through WPC communication is not implemented.

In the processing illustrated in FIG. 4, the processing in steps S402 to S403 may be performed after step S405. Specifically, in step S405, whether a specific response to the Polling request (step S401) has been received is determined, and if a specific response has been received (YES in step S405), in step S402, it may be determined whether an error has occurred in the specific response.

In addition, in the processing performed in step S405 illustrated in FIG. 4, the following two determinations may be separately performed. More specifically, the NFC processing unit 302 may determine whether a response to the Polling request (step S401) has been received, and if a response has been received, determine whether the response is a response indicating that the P2P mode is not supported. If a response has not been received, and if a response has been received but the response is not a response indicating that the P2P mode is not supported, the NFC processing unit 302 may perform the processing illustrated in step S406. If a response has been received and the response indicates that the P2P mode is not supported, the processing may proceed to the processing in step S407.

In the above-described present exemplary embodiment, the processing of the NFC processing unit 302 illustrated in FIG. 4 is continuously and repeatedly executed while the TX 100 is in an activated state. Nevertheless, the present exemplary embodiment is not limited to this, and the processing may be started or stopped at a specific timing. For example, the processing illustrated in FIG. 4 may be executed while the WPC processing unit 301 detects a nearby object using an Analog Ping. With this configuration, the processing illustrated in FIG. 4 can be stopped when an object does not exist near the TX 100, and power consumption in the TX 100 can be reduced. Further, the processing illustrated in FIG. 4 may be executed during a period from when the WPC processing unit 301 receives a Signal Strength Packet to when an End Power Transfer Packet is received. With this configuration, the processing illustrated in FIG. 4 can be stopped when an RX having a WPC function does not exist near the TX 100, and power consumption in the TX 100 can be further reduced. Furthermore, a timing at which the TX 100 starts the processing illustrated in FIG. 4 may be set to a timing at which the WPC processing unit 301 is requested to output GP that is equal to or larger than a preset threshold value, by the Specific Request Packet. With this configuration, the TX 100 executes the processing illustrated in FIG. 4 only when power transmission processing is executed with an output that might damage an NFC tag, and therefore power consumption in the TX 100 can be further reduced.

The description has been given of an example in which a program for operating the NFC processing unit 302 is executed by the control unit 101. However, the program may be executed by a different control unit (not illustrated). Specifically, the TX 100 may be mounted inside a different not-illustrated device (e.g., a printer, personal computer, and mobile battery), and a different control unit that executes a control program of the function of the different device may execute a program for operating the NFC processing unit 302.

(Modified Example Related to WPC Processing)

Even in a state in which the TX 100 does not restrict GP (for example, step S523), charging may be continued in a state in which an NFC tag is not damaged. Specifically, the NFC processing unit 302 notifies the WPC processing unit 301 that NFC identifier information has increased, or an error has occurred, while the TX 100 performs power transmission in a state where GP is not restricted as described in step S523. The WPC processing unit 301 then recognizes that a cause for restriction of GP has occurred when the WPC processing unit 301 receives the notification. The TX 100 therefore transmits a GP re-negotiation request to the RX 200, transitions to the Re-negotiation phase defined by the WPC standard, and performs re-negotiation of GP. Since the reason for restriction of GP has occurred at the time point, the TX 100 can set a power value that does not damage an NFC tag, as GP, and transmit a response indicating the power value. As a configuration in which the TX 100 transmits a GP re-negotiation request to the RX 200, the TX 100 may notify the RX 200 that NFC identifier information has become nonexistent or an error has been resolved, and the RX 200 may transmit a GP re-negotiation request in response to the notification.

A configuration in which the TX 100 transmits a GP re-negotiation request to the RX 200 may be the following configuration. That is to say, the TX 100 may notify the RX 200 that NFC identifier information has become nonexistent or has increased, or an error has been resolved or occurred, and the RX 200 may transmit a GP re-negotiation request in response to the notification.

In addition, in the above-described present exemplary embodiment, a power transmission output value, which is determined not to damage an NFC tag even if the TX 100 performs power transmission processing, is 0.5 watts. However, the power transmission output value may be a different value as long as the power transmission output value does not damage an NFC tag. Specifically, the power transmission output value may be 5 watts defined by the WPC standard as a value of GP when power transmission starts in the Power Transfer phase without transitioning to the Negotiation phase (NO in step S508). The power transmission output value may also be a different value.

(Other Modified Examples)

In the present exemplary embodiment, NFC has been described as an example, but communication is not limited to this. For example, the present exemplary embodiment can be applied even when the RX 200 includes a communication function of behaving like a tag that performs communication other than NFC, and might be damaged by power transmission with high power.

In the present exemplary embodiment, an NFC device is detected based on a response to Polling processing performed by the second communication unit 202. However, the detection of an NFC device is not limited to this. Similarly, the RX 200 needs not be detected by communication via the first communication unit 104. For example, a user of the RX 200 may notify the TX 100 that an apparatus being an NFC device and the RX 200 is placed on the charging stand, via a user interface of the TX 100. Even in this case, an NFC tag is sometimes placed on the charging stand, and it is therefore sufficient that the above-described NFC processing or WPC processing is executed.

Other Exemplary Embodiments

A power transmission method of the wireless power transmitting system is not specifically limited. The power transmission method may be a magnetic field resonance method in which power is transmitted by coupling caused by magnetic field resonance between a resonator (resonance element) of a power transmitting apparatus and a resonator (resonance element) of a power receiving apparatus. An electromagnetic induction method, an electric field resonance method, a microwave method, or a power transmission method using laser may also be used.

An exemplary embodiment of the present disclosure can also be implemented by processing of supplying a program for implementing one or more functions of the above-described exemplary embodiment, to a system or an apparatus via a network or a storage medium, and one or more processors in a computer of the system or the apparatus reading and executing the program. Further, an exemplary embodiment of the present disclosure can also be implemented by a circuit (e.g., ASIC) that implements one or more functions.

The power transmitting apparatus and the power receiving apparatus may be an image input apparatus, such as an imaging apparatus (e.g., camera, and video camera) and a scanner, or an image output apparatus, such as a printer, a copying machine, and a projector. The power transmitting apparatus and the power receiving apparatus may also be a storage device, such as a hard disc device and a memory device, or an information processing apparatus, such as a PC and a smartphone.

The flowchart illustrated in FIG. 4 or 5 is started when power is supplied to a control unit of a power transmitting apparatus. The processing illustrated in FIG. 4 or 5 is implemented by a control unit executing a program stored in a memory of a power transmitting apparatus. The processing illustrated in FIG. 8 is implemented by a control unit executing a program stored in a memory of a power receiving apparatus.

In addition, at least part of the processing illustrated in the flowchart in FIG. 4, 5, or 8 may be implemented by hardware. If hardware is implemented for the implementation, it is sufficient that a dedicated circuit is automatically generated on an FPGA from a program for implementing each step, by using, for example, a predetermined compiler. In addition, similarly to an FPGA, a Gate Array circuit may be formed and implemented as hardware.

The present disclosure is not limited to the above-described exemplary embodiment, and various changes and modifications can be made without departing from the spirit and scope of the present disclosure. The following Claims are therefore appended for setting forth the scope of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an aspect of the present disclosure, a power receiving apparatus that performs communication based on a standard of NFC can appropriately receive power.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power transmitting apparatus comprising:
a power transmitting unit configured to perform wireless power transmission to a power receiving apparatus;
a first communication unit configured to receive, from the power receiving apparatus, a first packet to request capability of the power transmitting apparatus and a second packet including information on requested power by the power receiving apparatus and configured to negotiate power to be transmitted with the power receiving apparatus; and
a second communication unit configured to perform polling using an NFC communication method, configured to receive, using the NFC communication method, a response to the polling, and configured to perform detection processing for detecting, based on the received response to the polling, an NFC tag which is different from the power receiving apparatus;
wherein
in a Negotiation Phase, in a case where the NFC tag is detected, the first communication unit negotiates, as the power to be transmitted, power limited to avoid damaging the NFC tag and in the case where the NFC tag is not detected, the first communication unit negotiates, as the power to be transmitted, power based on a maximum transmittable power that is higher than the limited power in the case where the NFC tag is detected,
in a Power Transfer Phase, the power transmitting unit performs the wireless power transmission to the power receiving apparatus based on the negotiated power that is not zero, regardless of the negotiated power being the limited power in the case where the NFC tag is detected,
in the Negotiation Phase, the first communication unit transmits, to the power receiving apparatus, a response packet for the received first packet, the response packet including first information indicating that the power is limited in the case where the NFC tag is detected, and the response packet including second information indicating the power that is based on the maximum transmittable power in the case where the NFC tag is not detected, and
in the Negotiation Phase, the first communication unit transmits, to the power receiving apparatus, for the received second packet, a Negative Acknowledgement packet in a case where the requested power is larger than a threshold set to avoid damaging the NFC tag and transmits an Acknowledgement packet in a case where the requested power is not larger than the threshold.

2. The power transmitting apparatus according to claim 1, wherein, in the case where the NFC tag is not detected by the second communication unit, the power transmitting unit performs wireless power transmission based on the requested power.

3. The power transmitting apparatus according to claim 1, wherein
in a case where the power receiving apparatus is operating in a card emulation mode, the first communication unit receives the first information identified as an object communicating using the NFC communication method, from the power receiving apparatus,
the second communication unit receives the second information identified as an object communicating using the NFC communication method, from an apparatus communicating using the NFC communication method, and
in a case where the first information received by the first communication unit is not same as the second information received by the second communication unit, the second communication unit determines that the NFC tag exists.

4. The power transmitting apparatus according to claim 3, wherein
the first communication unit receives an Extended Identification Packet defined in a standard of Wireless Power Consortium, and
the first information is included in the Extended Identification Packet.

5. The power transmitting apparatus according to claim 1, wherein, in a case where more than one NFC tag responds to the polling, the first communication unit limits the power.

6. The power transmitting apparatus according to claim 1, wherein, in the case where the NFC tag is not detected, a value of the power is a first value, and
wherein, in the case where the NFC tag is detected, a value of the power is a second value lower than the first value.

7. The power transmitting apparatus according to claim 1, wherein the response packet is a packet of Power Transmitter Capability defined in a standard of Wireless Power Consortium.

8. The power transmitting apparatus according to claim 1, wherein the first packet is a packet of General Request defined in a standard of Wireless Power Consortium.

9. The power transmitting apparatus according to claim 1, wherein, in the case where the NFC tag is detected and the first communication unit receives a specific signal from the power receiving apparatus, the power is not limited.

10. The power transmitting apparatus according to claim 9, wherein the specific signal is a packet of Extended Identification defined in a standard of Wireless Power Consortium.

11. A method for a power transmitting apparatus, the method comprising:
performing polling using an NFC communication method;
receiving, using the NFC communication method, a response to the polling;
performing, based on the received response to the polling, detection processing for an NFC tag which is different from a power receiving apparatus and communicates using the NFC communication method;
performing negotiation with the power receiving apparatus so that power is limited to avoid damaging the NFC tag in a case where the NFC tag is detected;
performing, in a case where the NFC tag is not detected, negotiation about the power based on a maximum transmittable power that is higher than the power limited in the case where the NFC tag is detected;
performing, in a Power Transfer phase, the wireless power transmission to the power receiving apparatus based on the negotiated power that is not zero, regardless of the NFC tag is detected;
receiving, from the power receiving apparatus, a first packet to request capability of the power transmitting apparatus;
transmitting, to the power receiving apparatus, a response packet for the received first packet, the response packet including first information representing that the power is limited in the case where the NFC tag is detected, and the response packet including second information on the power that is based on the maximum transmittable power;
receiving, from the power receiving apparatus, a second packet including information on requested power which the power receiving apparatus requests; and
transmitting to the power receiving apparatus, for the received second packet, a Negative Acknowledgement packet in a case where the requested power is larger than a threshold set to avoid damaging the NFC tag, and transmitting an Acknowledgement packet in a case where the requested power is not larger than the threshold.

12. A non-transitory computer-readable storage medium storing a program for causing a computer to execute a method for a power transmitting apparatus, the method comprising:
performing polling using an NFC communication method;
receiving, using the NFC communication method, a response to the polling;
performing, based on the received response to the polling, detection processing for an NFC tag which is different from a power receiving apparatus and communicates using the NFC communication method;
performing negotiation with the power receiving apparatus so that power is limited to avoid damaging the NFC tag in a case where the NFC tag is detected;
performing, in a case where the NFC tag is not detected, negotiation about the power based on a maximum transmittable power that is higher than the power limited in the case where the NFC tag is detected;
performing, in a Power Transfer phase, the wireless power transmission to the power receiving apparatus based on the negotiated power that is not zero, regardless of the NFC tag is detected;
receiving, from the power receiving apparatus, a first packet to request capability of the power transmitting apparatus;
transmitting, to the power receiving apparatus, a response packet for the received first packet, the response packet which includes information representing that the power is limited in the case where the NFC tag is detected, and which includes information on the power based on the maximum transmittable power;
receiving, from the power receiving apparatus, a second packet including information on requested power which the power receiving apparatus requests; and
transmitting to the power receiving apparatus, for the received second packet, a Negative Acknowledgement packet in a case where the requested power is larger than a threshold set to avoid damaging the NFC tag, and transmitting an Acknowledgement packet in a case where the requested power is not larger than the threshold.

* * * * *